(12) United States Patent
Koch et al.

(10) Patent No.: US 11,915,203 B2
(45) Date of Patent: Feb. 27, 2024

(54) VEHICLE SERVICE SCHEDULING

(71) Applicant: Polaris Industries Inc., Medina, MN (US)

(72) Inventors: Douglas Koch, Medina, MN (US);
John Kastanek, Medina, MN (US);
Bridget McLennan, Medina, MN (US);
Nicole Wolverton, Medina, MN (US);
Josh Grube, Medina, MN (US); Adam McCullough, Medina, MN (US);
Deirdre O'Connell, Medina, MN (US);
Alex Royalty, Medina, MN (US);
David Duckworth, Medina, MN (US);
Jamie Curran, Medina, MN (US);
Evan Hoffman, Medina, MN (US)

(73) Assignee: Polaris Industries Inc., Medina, MN (US)

( * ) Notice: Subject to any disclaimer, the term of this patent is extended or adjusted under 35 U.S.C. 154(b) by 157 days.

(21) Appl. No.: 16/689,212

(22) Filed: Nov. 20, 2019

(65) Prior Publication Data

US 2021/0150490 A1 May 20, 2021

(51) Int. Cl.
*G06Q 10/20* (2023.01)
*G06Q 10/1093* (2023.01)
(Continued)

(52) U.S. Cl.
CPC ......... *G06Q 10/20* (2013.01); *G06F 3/04817* (2013.01); *G06F 9/542* (2013.01); *G06Q 10/1097* (2013.01)

(58) Field of Classification Search
None
See application file for complete search history.

(56) References Cited

U.S. PATENT DOCUMENTS 6,370,454 B1   4/2002   Moore
6,542,794 B2   4/2003   Obradovich
(Continued)

FOREIGN PATENT DOCUMENTS

WO   2013141796   9/2013

OTHER PUBLICATIONS

Ford Mobile Service Fixes Your Car Wherever You Are; May 20, 2019; 3 pages.
(Continued)

*Primary Examiner* — Stephanie Z Delich
(74) *Attorney, Agent, or Firm* — Faegre Drinker Biddle & Reath LLP

(57) ABSTRACT

Embodiments of the present disclosure relate scheduling maintenance services for a special-purpose vehicle. In an exemplary embodiment, a user device comprises a user interface, a processor, and memory comprising instructions that when executed by the processor cause the processor to output, to the user interface, a plurality of service method icons. The plurality of service methods comprise a first service method icon corresponding to a service being performed on the special-purpose vehicle at a first location and a second service method icon corresponding to the service being performed on the special-purpose vehicle at a second location. The first location and the second location are different locations. The memory also comprises instructions that when executed by the processor cause the processor to receive, via the user interface, a selection of a service method icon of the plurality of service method icons and send, to a scheduling server, a signal corresponding to the selected service method icon. In addition, the memory comprises instructions that when executed by the processor cause the processor to receive, from the scheduling server, a
(Continued)

notification of a scheduled service based on the selected service method icon to be performed by the service provider.

32 Claims, 17 Drawing Sheets

(51) Int. Cl.
*G06F 3/04817* (2022.01)
*G06F 9/54* (2006.01)

(56) References Cited

U.S. PATENT DOCUMENTS

| | | | |
|---|---|---|---|
| 7,188,073 B1 | 3/2007 | Tam | |
| 7,359,864 B2 | 4/2008 | Carlson | |
| 7,542,833 B2 | 6/2009 | Kelly | |
| 7,580,862 B1 | 8/2009 | Montelo | |
| 7,587,265 B2 | 9/2009 | Kwon | |
| 7,636,623 B2 | 12/2009 | Kelly | |
| 7,664,667 B1 | 2/2010 | Ruppelt | |
| 8,010,423 B2 | 8/2011 | Bodin | |
| 8,015,049 B2 | 9/2011 | Tam | |
| 8,060,274 B2 | 11/2011 | Boss | |
| 8,099,308 B2 | 1/2012 | Uyeki | |
| 8,135,804 B2 | 3/2012 | Uyeki | |
| 8,521,654 B2 | 8/2013 | Ford | |
| 8,924,071 B2 | 12/2014 | Stanek | |
| 8,938,427 B2* | 1/2015 | Ghani | G06Q 30/02 707/640 |
| 9,466,154 B2 | 10/2016 | Akselrod | |
| 9,472,027 B2 | 10/2016 | Akselrod | |
| 9,665,992 B2 | 5/2017 | Akselrod | |
| 9,881,427 B2 | 1/2018 | Barajas Gonzalez | |
| 10,049,505 B1 | 8/2018 | Harvey | |
| 10,553,119 B1* | 2/2020 | Shah | G06N 3/08 |
| 2001/0027481 A1 | 10/2001 | Whyel | |
| 2002/0035521 A1 | 3/2002 | Powers | |
| 2002/0107716 A1 | 8/2002 | Callahan | |
| 2002/0111727 A1* | 8/2002 | Vanstory | G06Q 10/20 701/32.6 |
| 2002/0111844 A1* | 8/2002 | Vanstory | G06Q 10/06 705/7.13 |
| 2004/0153356 A1 | 8/2004 | Lockwood | |
| 2005/0027580 A1 | 2/2005 | Crici | |
| 2007/0288138 A1 | 12/2007 | Bodin | |
| 2008/0172258 A1* | 7/2008 | Weger | G06Q 10/00 705/4 |
| 2008/0249830 A1 | 10/2008 | Gilman | |
| 2009/0106036 A1 | 4/2009 | Tamura | |
| 2009/0222161 A1 | 9/2009 | Tsai | |
| 2011/0010432 A1* | 1/2011 | Uyeki | G06Q 30/0283 709/219 |
| 2012/0053778 A1 | 3/2012 | Colvin | |
| 2012/0136527 A1 | 5/2012 | McQuade | |
| 2012/0136743 A1 | 5/2012 | McQuade | |
| 2012/0136802 A1 | 5/2012 | McQuade | |
| 2013/0218761 A1 | 8/2013 | Kwasny | |
| 2013/0253972 A1 | 9/2013 | Jervis | |
| 2013/0325541 A1 | 12/2013 | Capriotti | |
| 2014/0046715 A1 | 2/2014 | Lau | |
| 2014/0222482 A1 | 8/2014 | Gautam | |
| 2015/0227880 A1 | 8/2015 | Pierrelouis | |
| 2015/0262119 A1* | 9/2015 | Santo, Jr. | G06Q 10/087 705/28 |
| 2016/0071338 A1 | 3/2016 | McQuade | |
| 2016/0342456 A1 | 11/2016 | McQuade | |
| 2016/0343177 A1 | 11/2016 | McQuade | |
| 2016/0350985 A1 | 12/2016 | McQuade | |
| 2017/0076344 A1 | 3/2017 | McQuade | |
| 2017/0124525 A1 | 5/2017 | Johnson | |
| 2017/0308864 A1 | 10/2017 | Kelley | |
| 2018/0018731 A1* | 1/2018 | Rodriguez | G06Q 30/0645 |
| 2018/0057347 A1 | 3/2018 | Oesterling | |
| 2018/0068355 A1 | 3/2018 | Garry | |
| 2018/0075668 A1 | 3/2018 | Barajas Gonzalez | |
| 2018/0121862 A1 | 5/2018 | Garry | |
| 2019/0035170 A1 | 1/2019 | Dede | |
| 2019/0213559 A1 | 7/2019 | Beltran | |
| 2019/0213667 A1 | 7/2019 | Gile | |
| 2019/0230181 A1* | 7/2019 | Wang | H04L 67/567 |

OTHER PUBLICATIONS

Tesla Mobile Service Support, accessed Jun. 24, 2019; 3 pages.
Office Action issued by the Canadian Intellectual Property Office, dated Mar. 29, 2021, for Canadian Patent Application No. 3,063,462; 6 pages.

* cited by examiner

RIDEREADY
YOUR SERVICE ON DEMAND

MY GARAGE | MY APPOINTMENTS | NOTIFICATIONS | SUPPORT

& Welcome Jon Smith | Log Out

Your Appointment Has Been Confirmed!

Preparing For Your Service

We are looking forward to your appointment. Getting your vehicle serviced quickly so that you can be ready to ride any time that you want is our top priority.

Your service provider will be in contact to set up the pick up and vehicle drop-off times.

If at any point in time you wish to change or cancel your appointment please contact your service provider. If a cancellation occurs within 24 hours of your appointment you will be charged a cancellation fee of $100.00

To ensure that your appointment goes smoothly here's what to expect for your At Home service:

| Have your vehicle ready to go | Be in the know with notifications | Payment |
|---|---|---|
| Make sure that your vehicle is easily accessible for our technicians in order to properly load your vehicle on our truck. | We'll be sure to keep you updated on the progress of your service and when it's complete. Make sure to check your dashboard or e-mail for service updates. | As a reminder we will not be charging your card until the service is complete. Please inform your dealer in advance if you have a coupon or prior to service completion. |

⊕ Add appointment

[ My Garage ]

Friday
September 13, 2019
10:00 AM
ADD TO CALENDAR
Transport
2019 Polaris General® XP 1000
Services:
Oil Change
CHOPPER CITY SPORTS
7191 HWY 65 NE
FRIDLEY, MN 55432
(000)-000-0000

VEHICLE SERVICE SCHEDULING

TECHNICAL FIELD

Embodiments of the present disclosure relate to maintaining a vehicle. More particularly, embodiments of the present disclosure relate to scheduling maintenance services for a vehicle.

BACKGROUND

Utility vehicles and recreational vehicles can require additional maintenance. Examples of utility vehicles include, but are not limited to, low-speed vehicles (e.g., golf carts), lawn mowers, and fleet vehicles. Examples of recreational vehicles include, but are not limited to, all-terrain vehicles (ATVs), side by sides (SxS), a utility vehicle, a motorcycle, a slingshot (SLG), a tricycle, a snowmobile, and watercraft. Utility vehicles and recreational vehicles may be referred to herein as special-purpose vehicles. As an example of additional maintenance that a special-purpose vehicle may require, includes special-purpose vehicles that are used during different seasons. For each season, the special-purpose vehicle may require different capabilities and maintenance of the special-purpose vehicle. Also, the special-purpose vehicle may sit idle for periods of time between seasons and/or between use. Further, special-purpose vehicles can be used and/or stored at locations that are not primary residences of the owners. For example, some types of special purpose vehicles may be used and stored at an owner's cabin or another vacation property of the owner. Additionally, some types of special-purpose vehicle are not designed to travel long distances and doing so may result in unnecessary maintenance for the special-purpose vehicle. As such, an owner may use a trailer to transport the special-purpose vehicle but doing so requires the owner to own a trailer and a vehicle capable of towing the trailer and the special-purpose vehicle.

Due to one or more the factors described above, maintaining and scheduling maintenance of special-purpose vehicles is important but can be difficult. Embodiments disclosed herein provide improvements to conventional embodiments for scheduling maintenance services to be performed on a special-purpose vehicle.

SUMMARY

As set forth above, embodiments provided herein relate to scheduling maintenance services for a special-purpose vehicle. Exemplary embodiments include but are not limited to the following examples.

An exemplary embodiment comprises a user device for scheduling a service for a special-purpose vehicle, the user device comprises: a user interface; a processor; and memory comprising instructions that when executed by the processor cause the processor to: output, to the user interface, a plurality of service method icons comprising a first service method icon corresponding to a service being performed on the special-purpose vehicle at a first location and a second service method icon corresponding to the service being performed on the special-purpose vehicle at a second location, wherein the first location and the second location are different locations; receive, via the user interface, a selection of a service method icon of the plurality of service method icons; send, to a scheduling server, a signal corresponding to the selected service method icon; and receive, from the scheduling server, a notification of a scheduled service based on the selected service method icon to be performed by the service provider.

Another exemplary embodiment comprises a scheduling server for scheduling a service for a special-purpose vehicle, the scheduling server comprises: a processor; and memory comprising instructions that when executed by the processor cause the processor to: receive, from a user device of a user, a signal corresponding to a user scheduling a service for the special-purpose vehicle; receive, from the user device, a selected service method of a plurality of service methods, the plurality of service methods comprising a first service method corresponding to the service being performed on the special-purpose vehicle at a first location and a second service method icon corresponding to the service being performed on the special-purpose vehicle at a second location, wherein the first location and the second location are different locations; and schedule the service based on the selected service method to be performed by a service provider.

Another exemplary embodiment comprises a service provider device for scheduling a service for a special-purpose vehicle, the service provider interface comprising: a user interface; a processor; and memory comprising instructions that when executed by the processor cause the processor to: provide, to a scheduling server, at least one day and time a service provider associated with the service provider interface can provide the service for the special-purpose vehicle; provide, to the scheduling server, an indication the service provider provides a plurality of service methods comprising a first service method icon corresponding to a service being performed on the special-purpose vehicle at a first location and a second service method icon corresponding to the service being performed on the special-purpose vehicle at a second location, wherein the first location and the second location are different locations; and receive, from the scheduling server via the user interface, a notification of a scheduled service, the scheduled service based on a selected day and time for the service and the first location.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein:

FIG. 5 illustrates an example webpage of a service provider interface that includes the services the service provider can perform;

FIG. 6 illustrates an example webpage for selecting service methods a service provider provides;

FIG. 7 illustrates an example webpage for selecting a special-purpose vehicle to which a service is to be performed;

FIG. 12 illustrates an example webpage for selecting a day and time for the service to be performed;

FIG. 14 illustrates an example webpage for a notification to a user of a scheduled service to be performed;

FIG. 15 illustrates an example webpage for notifications to a service provider of scheduled services to be performed;

FIG. 16 illustrates an example webpage for notification details to a service provider of a scheduled service to be performed.

DETAILED DESCRIPTION OF THE DRAWINGS

Figure 1:
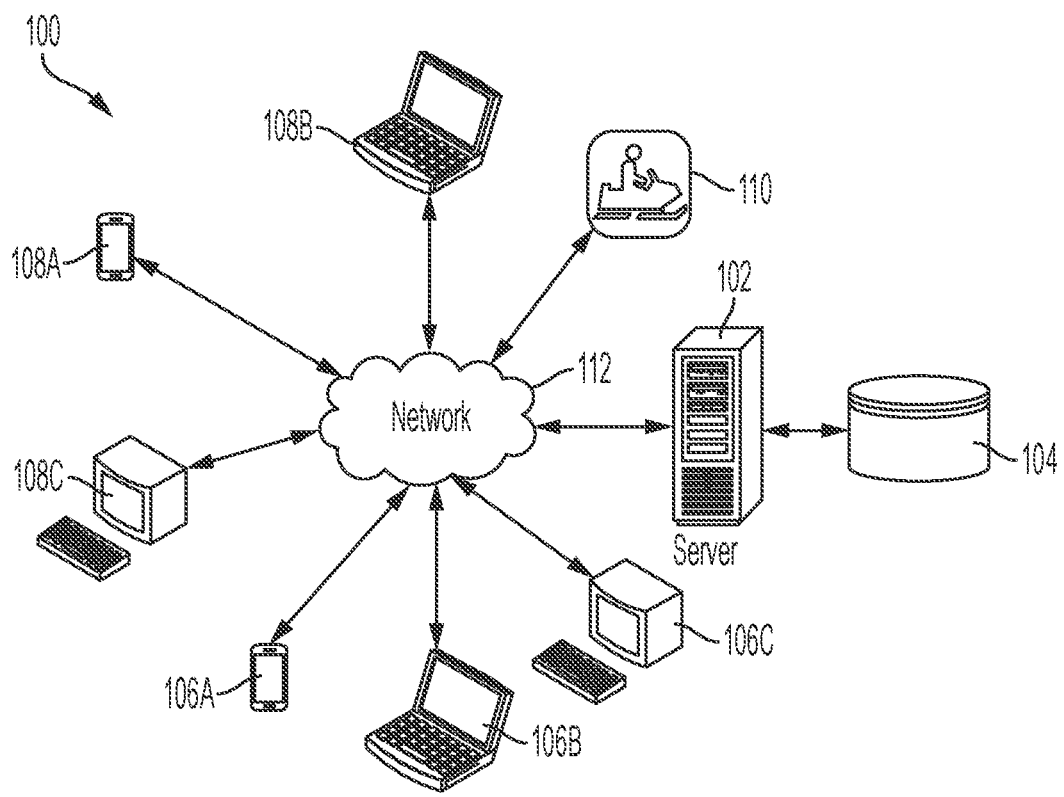
FIG. 1 illustrates a system for scheduling special-purpose vehicle services, according to an example of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As briefly discussed above, it is important to maintain a special-purpose vehicle. Doing so, however, can be difficult. For example, having service performed on a special-purpose vehicle generally requires trailering the special-purpose vehicle to the service provider's location. Embodiments of the present disclosure provide solutions to this problem by being able to schedule a service to be performed at different locations. For example, in one embodiment, a user can schedule a service to be performed at a property owned by the user by, for example, selecting the "remote" service method type. For the "remote' service method type, an address (e.g., home, cabin, office, etc.) at which the service is to be performed may be determined in a variety of manners. In one example, a user may select, specify and/or input the address using a user device. In another example, an address may be determined by, for example, GPS of a user device or vehicle. In another example, a user can schedule a service to be performed by a service provider where the service provider transports the special-purpose vehicle from a location specified by the user to a service location and then drops off the special-purpose vehicle at a drop-off location designated by the user by, for example, selecting the "transport" service method type. While the service method types are primarily discussed herein in relation to special-purpose vehicles, the service method types may also be used for other non-special-purpose vehicles and other types of products (e.g., generators, etc.).

FIG. 1 illustrates a system 100 for scheduling vehicle services, according to an example of the present disclosure. This diagram is merely an example, which should not unduly limit the scope of the claims. One of ordinary skill in the art would recognize many variations, alternatives, and modifications.

The system 100 includes a scheduling server 102, hosting a database 104. The scheduling server 102 generally corresponds to one or more computing systems configured to store data associated with one or more service provider capabilities and schedules in the database 104. The data associated with one or more service provider capabilities and schedules can be received from any of a plurality of service provider devices, such as the illustrated service provider devices 106A-106C. The scheduling server 102 also processes the data in the database 104 in order to schedule services for special-purpose vehicles. Exemplary services may include, but are not limited to, maintenance services, repair services, accessory installation services, and storage services. Examples of maintenance and repair services include, but are not limited to, oil changes, differential servicing, periodic service (e.g., annual service), tire rotation, air filter replacement, spark plug replacement, battery servicing, lightbulb servicing, and brake pad servicing. Examples of accessory installation services include, but are not limited to, handguard installations, handlebar and/or mounted mirror installations, brush-guard installations, rack installations, rack extender installations, and other installation services. Storage services may include storing a special-purpose vehicle at a location not owned by a user of the special-purpose vehicle.

In the embodiment shown, the scheduling server 102 is accessible by any of a plurality of user devices, such as the illustrated user devices 108A-108C. Exemplary user devices 108 include mobile devices 108A, 108B (e.g., mobile phones, tablet devices, and/or laptops). In some examples, the user devices 108 are incorporated into a special-purpose vehicle, such as the special-purpose vehicle 110. Other exemplary user devices 108 include a computing device 108C having a web browser installed thereon. However, for some uses of the scheduling server 102, a mobile device 108A, 108B may be required to enable some functionality. For example, as discussed below in connection with some embodiments, location-based services in which a user's location is determined via one or more sensors (e.g., GPS sensors incorporated into a user device 108 and/or special-purpose vehicle 110) may require use of a mobile device 108A, 108B and/or special-purpose vehicle 110 equipped with said one or more sensors. The user devices 108 and/or the special-purpose vehicles 110 may communicate with the scheduler server 102 via a network 112.

The network 112 may be, or include, any number of different types of communication networks such as, for example, a bus network, a short messaging service (SMS), a local area network (LAN), a wireless LAN (WLAN), a wide area network (WAN), the Internet, a P2P network, custom-designed communication or messaging protocols, and/or the like. The network 112 may include a combination of multiple networks.

In some examples, the scheduling server 102 receives a requested day and/or time for a service to be performed on a special-purpose vehicle 110. When a requested day and/or time is received, the scheduling server 102 may also request the locations of users' special-purpose vehicles 110. In some examples, the day and/or time for a service to be performed and the location of a user's special-purpose vehicle 110 is used by the scheduling server 102 to facilitate scheduling a service for the special-purpose vehicle 110. For example, the location of the user's special-purpose vehicle 110 may be used to determine which of a plurality of service providers are able to service the special-purpose vehicle 110 within the requested day and time. Additionally, or alternatively, the location of the user's special-purpose vehicle 110 may be used by the scheduling server 102 to determine the duration of a service and/or the recommended pricing of a service in the event the user selects the remote service method or the transport service method, as explained in more detail below.

As stated above, the system 100 includes a plurality of service provider devices 106. Each of the service provider devices 106 is associated with a service provider that can provide services to special-purpose vehicles 110. However, the types of maintenance services performed by each service provider may vary. The types of special-purpose vehicles 110 for which the service provider can provide maintenance services may also vary. Additionally, or alternatively, the days and times for which the service provider can provide maintenance services varies. And, the locations of the service providers vary. One or more of these variables may be considered when the scheduling server 102 schedules services to be performed on a special-purpose vehicle 110, as discussed below.

The service provider devices 106 may communicate with the scheduling server 102 via the network 112. Exemplary service provider devices 106 include mobile devices 106A, 106B (e.g., mobile phones, tablet devices, and/or laptops). Other exemplary service provider devices 106 include a computing device 106C having a web browser installed thereon. In some examples, the scheduling server 102 requests the days and times that a service provider associated with the service provider device 106 is available to service a special-purpose vehicle 110. The days and times may be updated and provided by the service provider device 106 to the scheduling server 102 as new appointments are scheduled. The scheduling server 102 may also request the locations at which a service provider provides services.

The scheduling server 102 can also request what types of service methods the service provider is available to perform. The types of service methods may include, but are not limited to, remote service, transport service, and drop-off service. Remote service entails a service provider traveling to a determined location (e.g., home, cabin, office, etc.) of a special-purpose vehicle 110 and performing the service on the special-purpose vehicle 110 at the specified location. In some examples, the determined location may be specified, selected, pre-determined (e.g., default to home, cabin, office, etc.) previously input and/or input by a user. In some examples, the determined location may be determined using, for example, GPS incorporated into a user device 108 and/or special-purpose vehicle 110. In some examples, the specified location is a property owned by a user of the special-purpose vehicle 110. Transport service entails a service provider traveling to a specified location of a special-purpose vehicle 110, transporting the special-purpose vehicle 110 from the specified location to a service location, performing the service at the service location, and then transporting the special-purpose vehicle 110 to a drop-off location. In at least one example, the specified location is the same as the drop-off location. In another example, the specified location is different than the drop-off location. Drop-off service entails a user dropping off the special-purpose vehicle 110 at a service provider's location. Additional details of these services are described in more detail below.

As discussed in more detail below, the scheduling server 102 can coordinate the days and times a service provider is available to service a special-purpose vehicle 110 with the requested day, time, and type of service method.

Figure 2:
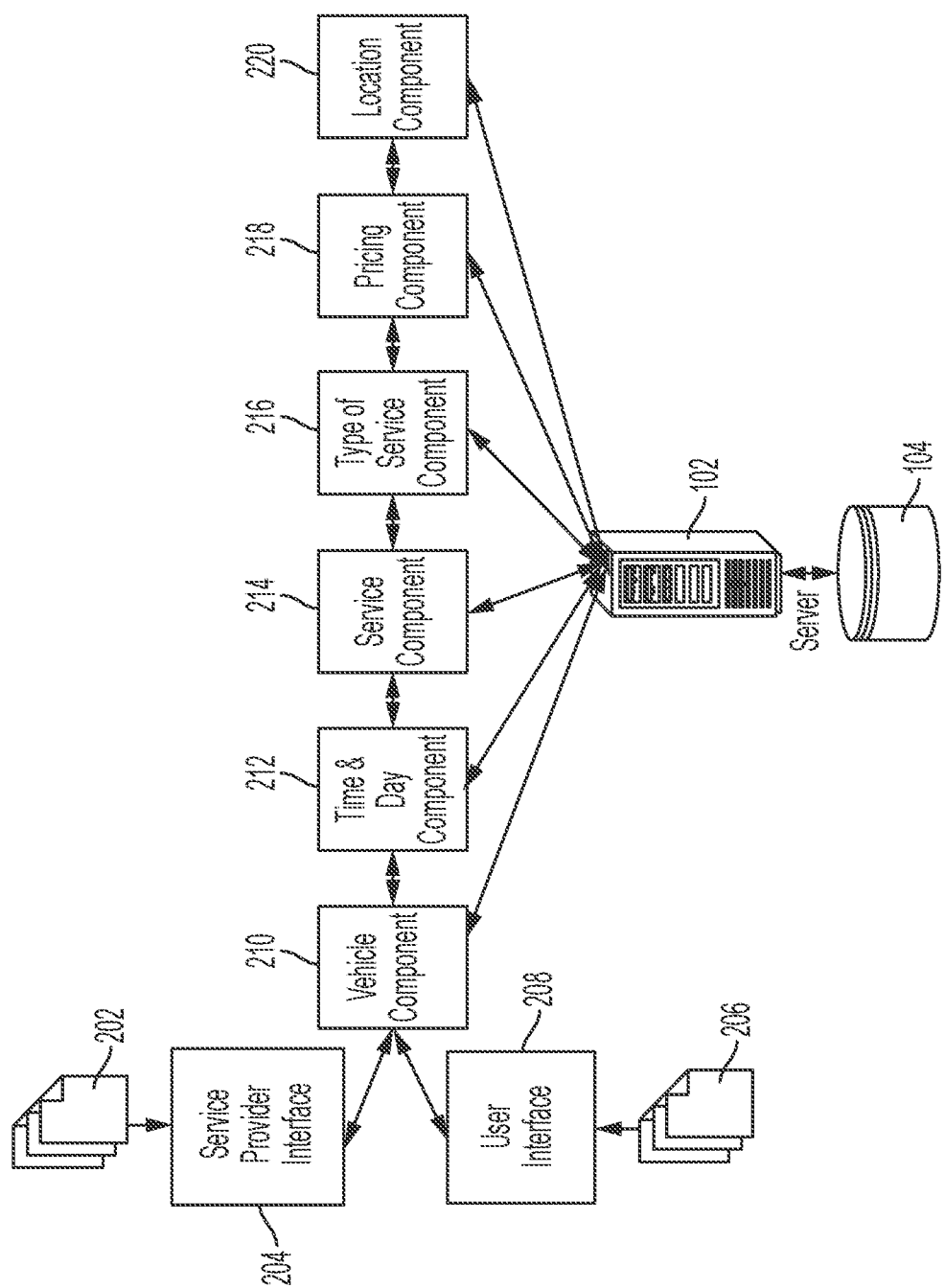
FIG. 2 illustrates components of a scheduling server configured to schedule special-purpose vehicle services, according to an example of the present disclosure.

FIG. 2 illustrates components of a scheduling server 102 configured to schedule special-purpose vehicle 110 services, according to an example of the present disclosure. This diagram is merely an example, which should not unduly limit the scope of the claims. One of ordinary skill in the art would recognize many variations, alternatives, and modifications.

In the illustrated embodiment, the scheduling server 102 receives service provider data 202 via a service provider interface 204. In some examples, the service provider interface 204 retrieves the service provider data 202 from a service provider device, such as the service provider device 106. In at least another example, the service provider interface 204 retrieves the service provider data 202 from third-party sources and/or websites, such as google, yelp, and/or the like. In at least another example, the service provider interface 204 receives the service provider data 202 in response to a service provider inputting the service provider data 202 via the service provider interface 204.

Provided below are examples of service provider data 202. For each of the examples, a service provider can customize and/or modify the service provider data 202 via a service provider interface 204. The customized and/or modified service provider data 202 can then be retrieved by and/or sent/provided to the scheduling server 102. Additionally, or alternatively, if the service provider data 202 is updated on a third-party website, the scheduling server 102 can retrieve the modified service provider data 202. The retrieval can occur on a periodic basis and/or on in response to a request to retrieve updated service provider data 202.

Figure 3:
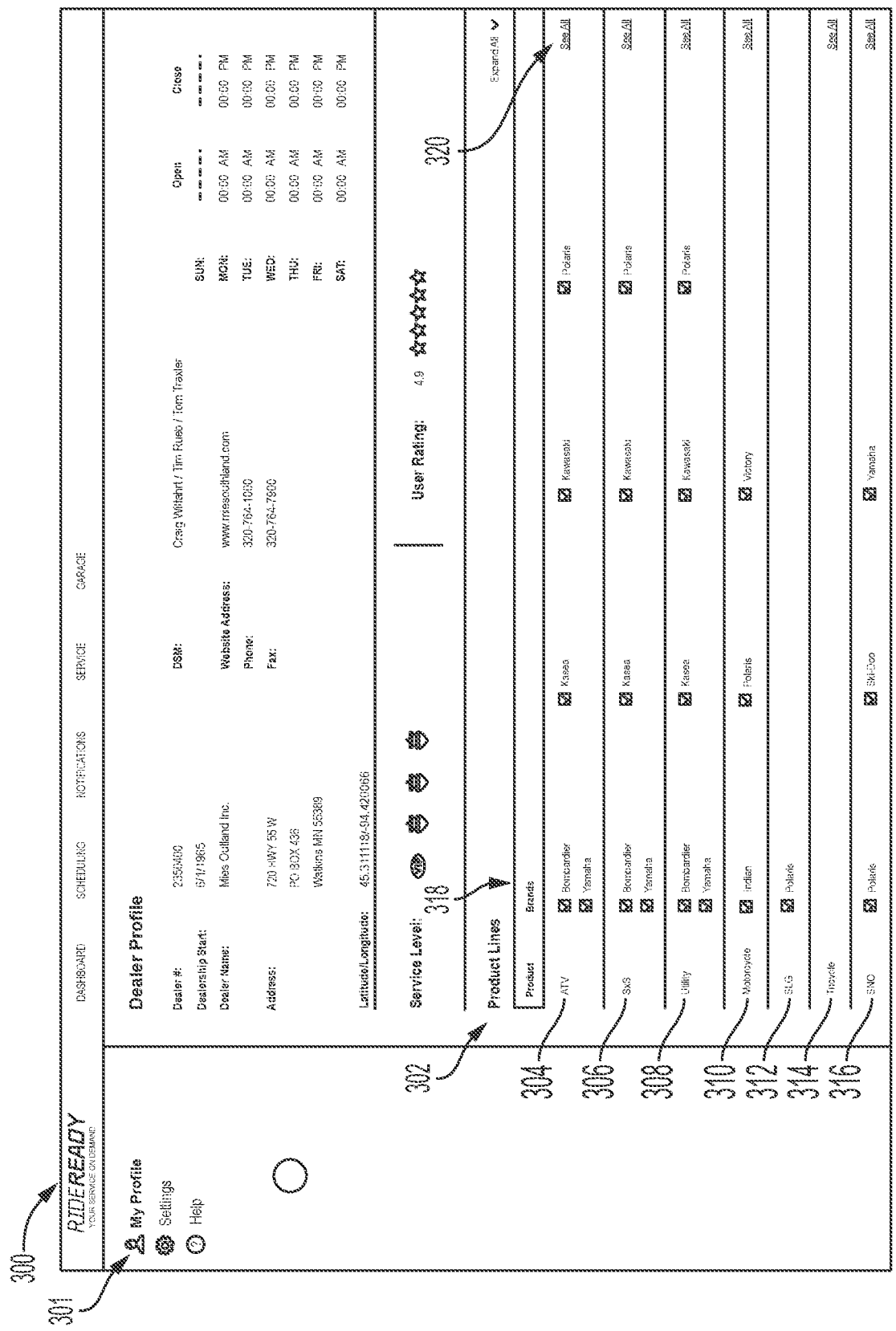
FIG. 3 illustrates an example webpage of a service provider interface that includes the product lines and brands for which the service provider services.

In an example, the service provider data 202 includes the product lines and/or brands for which a service provider can service. FIG. 3 illustrates an example webpage 300 of a service provider interface 204 that includes the product lines 302 and brands 303 for which the service provider services. In some examples, the term webpage 300 applies to a screen that is presented via an internet browser on a device, such as the devices 106B, 106C, 108B, 108C, or a screen that is presented via an application on a device, such as the device 106A, 108A.

To configure the product lines and/or brands, a service provider can click on the "my profile" icon 301, which will direct the service provider to the webpage 300. As illustrated, the product lines 302 may include a type of product, such as an all-terrain vehicle (ATV) 304, side by side (SxS) 306, a utility vehicle 308, a motorcycle 310, a slingshot (SLG) 312, a tricycle 314, a snowmobile (SNO) 316, commercial vehicles, boats, jet skis, other water craft, golf carts, other low-speed vehicles, lawn mowers, fleet vehicles, and/or other types of special-purpose vehicle 110 products (e.g., generators, etc.). However, these are only examples and not meant to be limiting. For each product line 302, a service provider can click on any of the brands 318 that the service provider services for the specific product line 302. As illustrated, the product lines 302 may also include the brand 318 of the product line 302. Knowing the product lines 302 and the brands 318 of the product lines 302 that a service provider can service can be used by the scheduling server 102 to schedule maintenance on a special-purpose vehicle 110, as discussed in more detail below. To modify the brand 318, a service provider can click on the "see all"

icon 320, which will show all the brands 318 for a given product line 302 and then a service provider can select or deselect a specific brand 318. Additionally, or alternatively, a service provider can select which services he/she provides for specific brands 318.

In exemplary embodiments, the scheduling server 102 can retrieve and/or receive the product lines 302 for which service providers can service. In some examples, the vehicle component 210 (of FIG. 2) of the scheduling server 102 can retrieve and/or receive the product lines 302. The vehicle component 210 can then compare the product lines 302 serviced by service providers with a special-purpose vehicle 110 that a user wants serviced in order to recommend service providers to a user, as described in more detail below.

Figure 4:
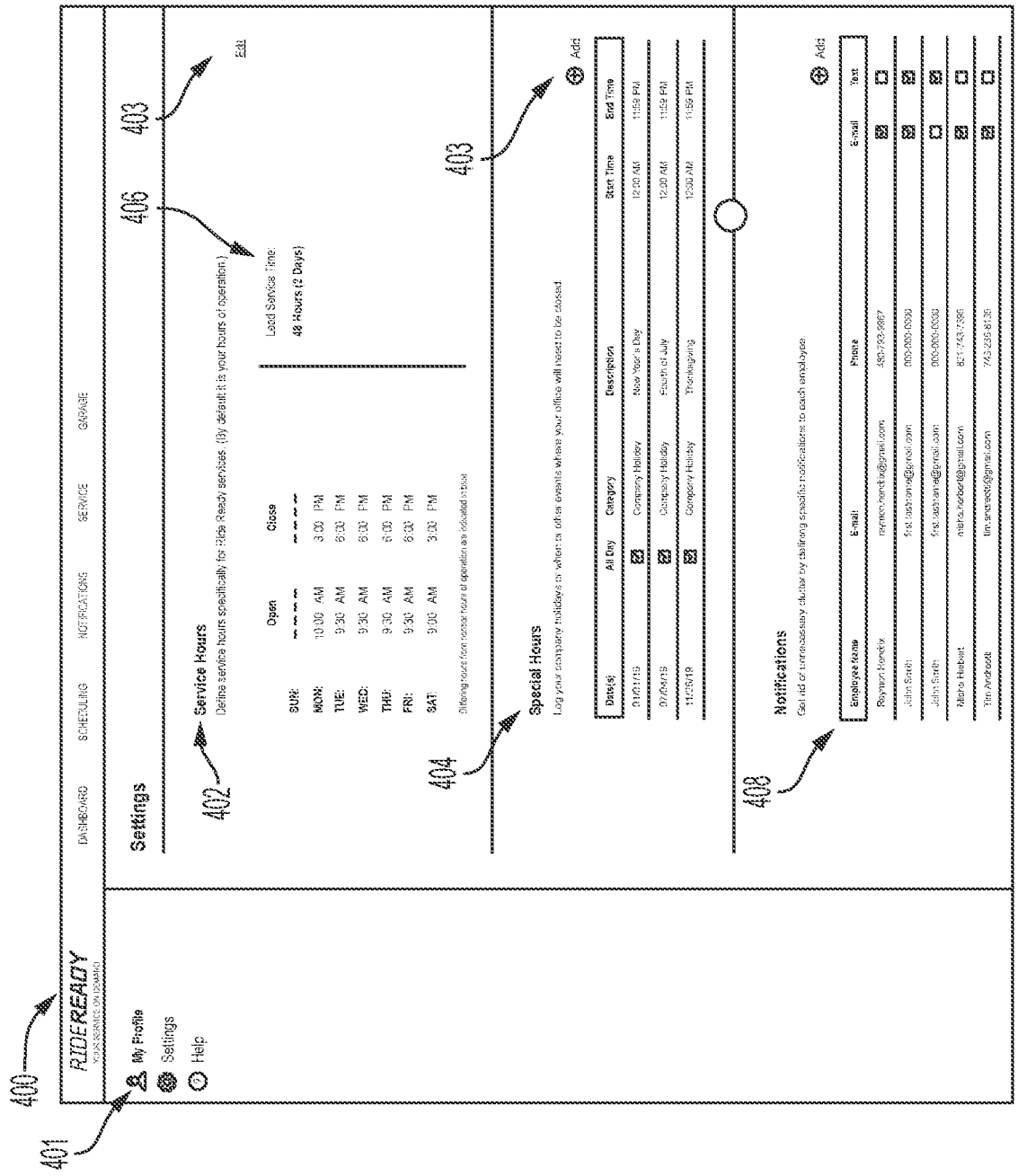
FIG. 4 illustrates an example webpage of a service provider interface for service hours for which the service provider provides services.

In another example, the service provider data 202 includes the service hours for which the service provider can perform services on a special-purpose vehicle 110. FIG. 4 illustrates an example webpage 400 of a service provider interface 204 for service hours 402 for which the service provider provides services. To configure the service hours, a service provider can click on the "settings" icon 401, which will direct the service provider to the webpage 400. As illustrated, the service hours 402 includes the days of the week the service provider provides services. Also included are the times for each day of the week that the service provider provides services. To modify the service hours, a service provider can click on the "edit" icon 403. In some examples, the service provider can have special hours 404, such as for holidays, vacations, and/or the like. To modify the special hours, a service provider can click on the "add" icon 405. Additionally, or alternatively, the service provider can provide a lead time 406 for which the service provider accepts appointments. For example, a service provider may only accept appointments that are booked more than 48 hours in advance to coordinate employee scheduling. In some examples, the service provider can specify the minimum amount of time required between when an appointment is booked and when the appointment is to occur.

As illustrated, the example webpage 400 of a service provider interface 204 can also include a list of contacts 408 that are notified in response to a scheduled appointment by the scheduling server 102. Example notifications may include, but are not limited to, email, text, or both.

In exemplary embodiments, the scheduling server 102 can retrieve and/or receive the service hours 402, the special hours 404, and the lead time 406 for service providers. In some examples, the time & day component 212 (of FIG. 2) of the scheduling server 102 can retrieve and/or receive the service hours 402, the special hours 404, and the lead time 406 for service providers. The time & day component 212 can then provide the service hours 402, the special hours 404, and the lead time 406 for a service provider to a user via a user device 108 in order to facilitate scheduling a service, as described in more detail below. In some examples, the special hours 404 may include holiday hours, hours when the service provider is short staffed, and/or other types of closings.

Figure 5:
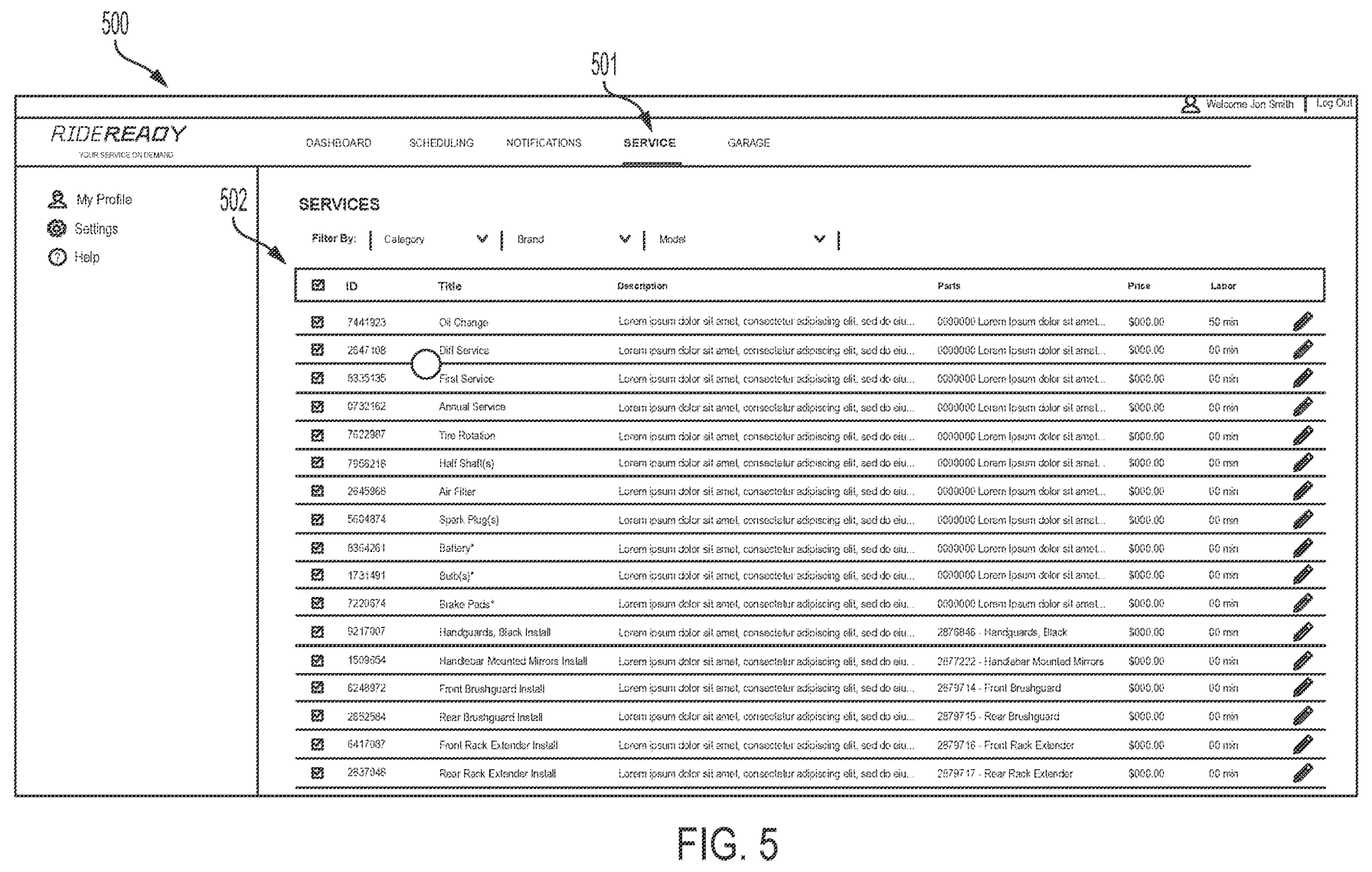

In even another example, the service provider data 202 includes the services that can be performed by a service provider. FIG. 5 illustrates an example webpage 500 of a service provider interface 204 that includes the services 502 the service provider can perform. To configure the services, a service provider can click on the "services" icon 501, which will direct the service provider to the webpage 500. As illustrated, exemplary services that can be performed by a service provider may include, but are not limited to, maintenance services, repair services, accessory installation services, and storage services. Examples of maintenance services and repair services include, but are not limited to, oil changes, differential servicing, periodic service (e.g., annual service), tire rotation, air filter replacement, spark plug replacement, battery servicing, lightbulb servicing, and brake pad servicing. Examples of accessory installation services include, but are not limited to, handguard installations, handlebar and/or mounted mirror installations, brushguard installations, rack installations, rack extender installations, and other installation services. In some embodiments, for installation services, a service provider can receive an order for an accessory device and the user can be provided with the option to have the service provider install the accessory device on the user's special-purpose vehicle 110. Storage services may include storing a special-purpose vehicle at a location not owned by a user of the special-purpose vehicle. In some examples, the user may specify a pickup and/or drop-off location before and after the storage, respectively, as well as the duration of the storage.

As stated above, the service provider can customize and/or modify the services 502 the service provider performs. In some examples, a service provider can click on one of the services 502 to customize and/or modify the services 502 a service provider performs, which navigates the service provider to the webpage 600 illustrated in FIG. 6.

In exemplary embodiments, the scheduling server 102 can retrieve and/or receive the services 502 that service providers are able to perform. In some examples, the service component 214 (of FIG. 2) of the scheduling server 102 can retrieve and/or receive the services 502 for service providers. The service component 214 can then provide the services 502 for a service provider to a user via a user device 108 in order to facilitate scheduling a service, as described in more detail below.

Figure 6:
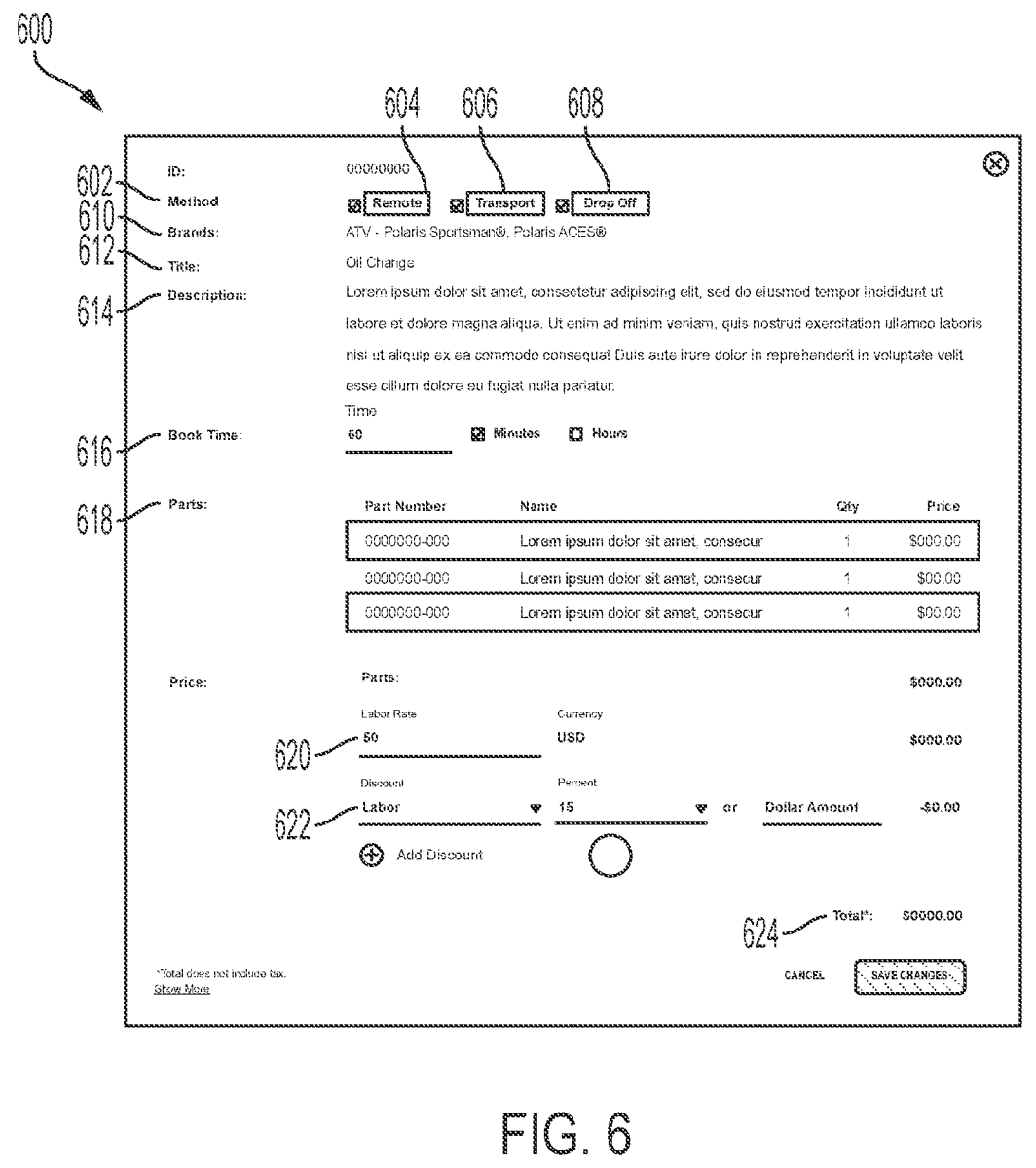

As illustrated in FIG. 6, the service provider can select a type of service method 602 the service provider performs for the specific service. The types of service methods 602 may include, but are not limited to, remote service 604, transport service 606, and drop-off service 608. As stated above, remote service 604 entails a service provider traveling to a specified location of a special-purpose vehicle 110 and performing the service on the special-purpose vehicle 110 at the specified location. In some examples, the specified location is a property owned by a user of the special-purpose vehicle 110. Transport service 606 entails a service provider traveling to a specified location of a special-purpose vehicle 110, transporting the special-purpose vehicle 110 from the specified location to a service location, performing the service at the service location, and then transporting the special-purpose vehicle 110 to a drop-off location. The specified location may the same as the drop-off location or may be different than the drop-off location. Drop-off service 608 entails a user drop off the special-purpose vehicle 110 at a service provider's location. In at least some embodiments, the type of service methods 602 performed by the service provider may be dependent on the services 502 performed by the service provider because some services may require more tools than others. As such, only some services 502 may be performed at via the remote service 604 method or the transport service 606 method.

As illustrated, the specific service may also include information about the brands 610 for which the service can be performed, the title 612 of the service, and a description 614 of the service. Additional details that are configurable by the service provider may include the duration 616 of the service and the parts 618 that are required to complete the service. The duration 616 of the service is used by the scheduling server 102 to schedule services, as discussed below, and the price for each of the parts 618 can be used to calculate the total cost 624 for the service. The service provider can also set a labor rate 620. In some examples, a suggested labor rate can be provided; however, the suggested labor rate 620 can be modified by the service provider. In some examples, the suggested labor rate depends on the product line 302 of the special-purpose vehicle being serviced. A labor discount 622 can also be set by the service provider.

In exemplary embodiments, the scheduling server 102 can retrieve and/or receive the types of service methods 602 that service providers are able to perform and for which services 502. In some examples, the type of service component 216 (of FIG. 2) of the scheduling server 102 can retrieve and/or receive the types of service methods 602 that service providers are able to perform and for which services 502. The type of service component 216 can then provide the types of service methods 602 that service providers are able to perform and for which services 502 to a user via a user device 108 in order to facilitate scheduling a service, as described in more detail below.

In some examples, the cost of the specific service depends on the service method type (e.g., remote, transport, or drop off). To calculate the cost for the remote service method, a service provider may determine the time of travel from the service location to the location specified by the user and back to the service location. The time of travel may be multiplied by a labor cost (e.g., the labor rate 620 or other rate) and added to a wear and tear cost for the service provider's transportation method to and from the designated location. To calculate the cost for the transport service method, a service provider may determine the time of travel (i) from the service location to a specified location, (ii) from the specified location to the service location, (iii) from the service location to a drop-off location, and (iv) from the drop-off location to the service location. The time of travel may be multiplied by a labor cost (e.g., the labor rate 620 or other rate) and added to a wear and tear cost for the service provider's transportation method. In some other embodiments, a cost for the service method type may be requested by a user when a user is scheduling a service as opposed to being initially provided by a service provider.

The total cost 624 for the service may then the sum of the labor rate 620 multiplied by the duration 616 minus the labor discount 622 plus the cost of (i) the parts, (ii) the specific type of service method, (iii) any shop supplies, and (iv) taxes. The total cost 624 can be provided to a user via a user interface as set forth below.

In exemplary embodiments, the scheduling server 102 can retrieve and/or receive the total cost 624 that service providers charge for services 502. In some examples, the pricing component 218 (of FIG. 2) of the scheduling server 102 can retrieve and/or receive the total cost 624 that service providers charge for services 502. The pricing component 218 can then provide the total cost 624 that service providers charge for services 502 to a user via a user device 108 in order to facilitate scheduling a service, as described in more detail below.

Referring to FIG. 2, the scheduling server 102 also receives user data 206 via a user interface 208. In some examples, the user interface 208 retrieves the user data 206 from a user device, such as the user device 108. In at least another example, the user interface 208 retrieves the user data 206 from third-party sources and/or websites, such as the department of motor vehicles, or other websites where a special-purpose vehicle 110 may be registered. In at least another example, the user interface 208 receives the user data 206 in response to a user inputting the user data 206 via the user interface 208.

Provided below are examples of user data 206. For each of the examples, a user can customize and/or modify the user data 206 via a user interface 208. The customized and/or modified user data 206 can then be retrieved by and/or sent/provided to the scheduling server 102. Additionally, or alternatively, if the user data 206 is updated on a third-party website, the scheduling server 102 can retrieve the modified user data 206. The retrieval can occur on a periodic basis and/or on in response to a request to retrieve updated user data 206.

Figure 7:
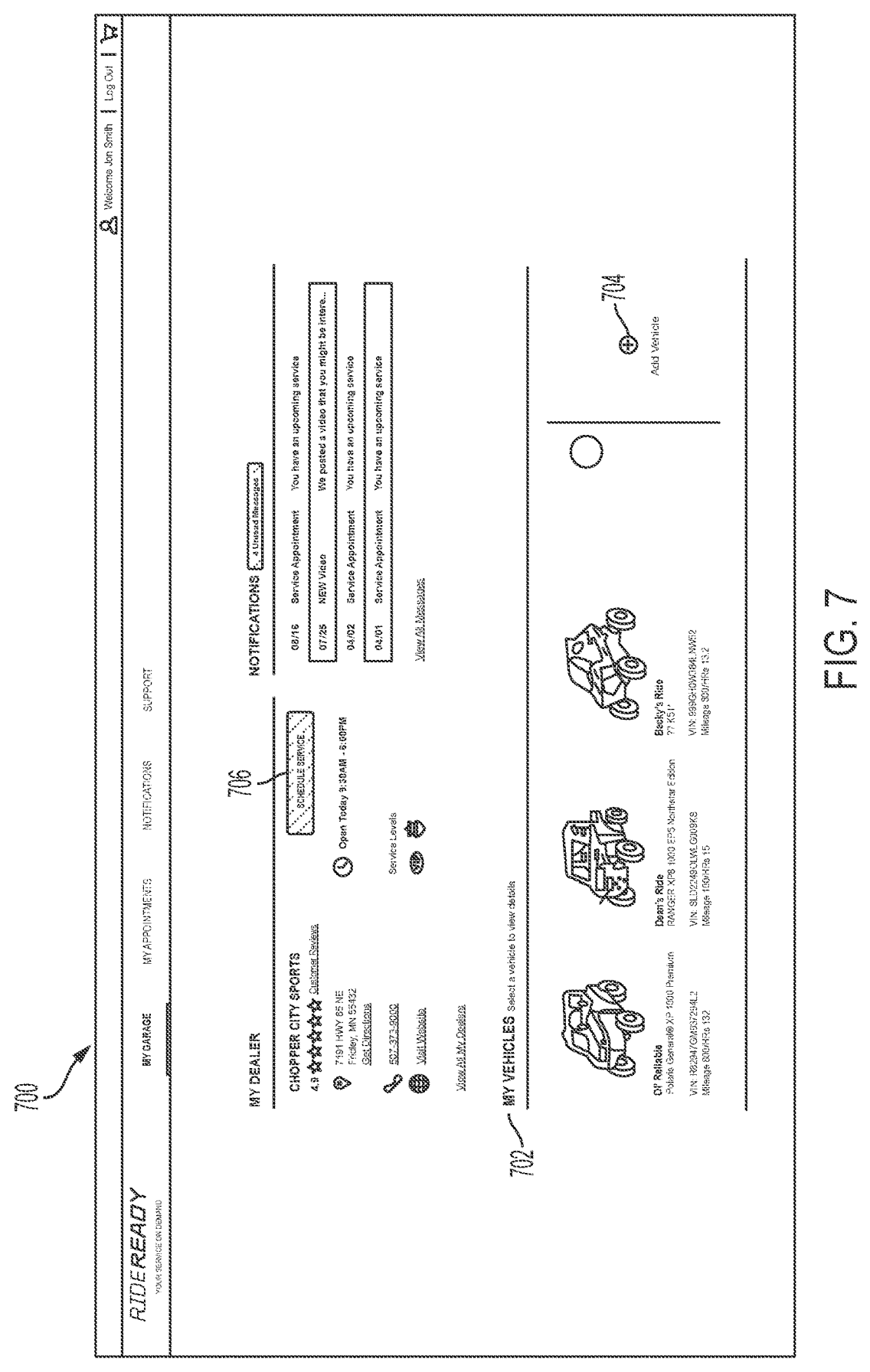
Figure 8:
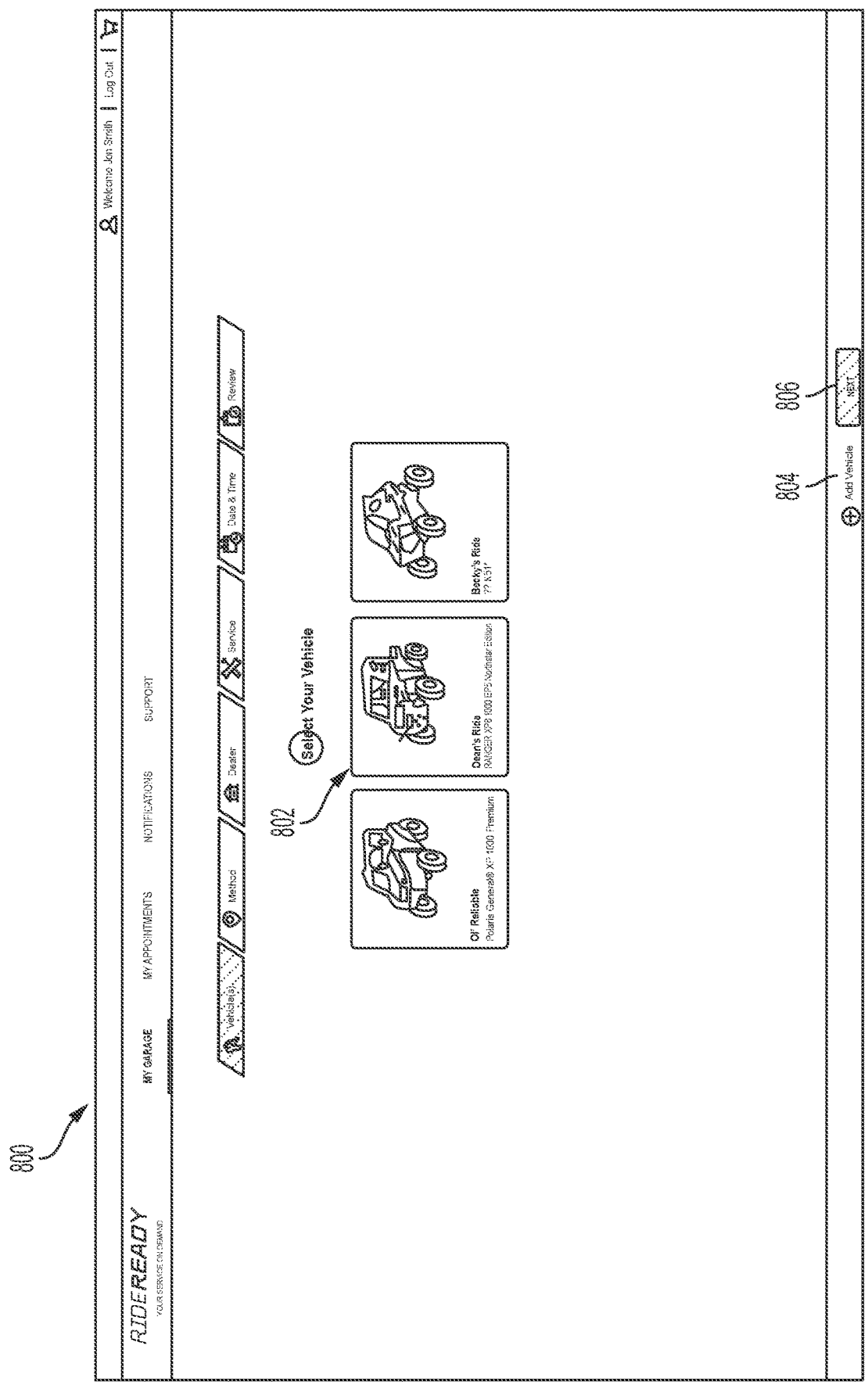
FIG. 8 illustrates an example webpage for selecting a special-purpose vehicle to which a service is to be performed.

In an example, the user data 206 includes the special-purpose vehicles 110 that a user owns. The special-purpose vehicles 110 that a user owns can be retrieved and/or received by the vehicle component 210 (of FIG. 2) and provided for selection to have a service performed thereon by a user via a user interface. FIG. 7 illustrates an example webpage 700 for selecting a special-purpose vehicle 110 to which a service is to be performed. As shown, the webpage 700 includes vehicles 702 owned by the user. If the user owns a vehicle that is not shown, the user can add another vehicle by clicking on the "add vehicle" icon 704. If a user wants to schedule a service for one of the vehicles 702, a user can select the "schedule service" icon 706. By clicking on the schedule service icon 706, the user is directed to the webpage 800 illustrated in FIG. 8.

On webpage 800, the user can select an icon corresponding to which special-purpose vehicle 802 on which a service is to be performed. In some examples, more than one vehicle 802 may be selected by a user for servicing. Similar to the webpage 700, if one of the user's vehicles 802 is not shown, the user can add the vehicle by clicking on the "add vehicle" icon 804. Once one or more vehicles 802 are selected, the user can click next 806, which will direct the user to the webpage 900 illustrated in FIG. 9.

Figure 9:
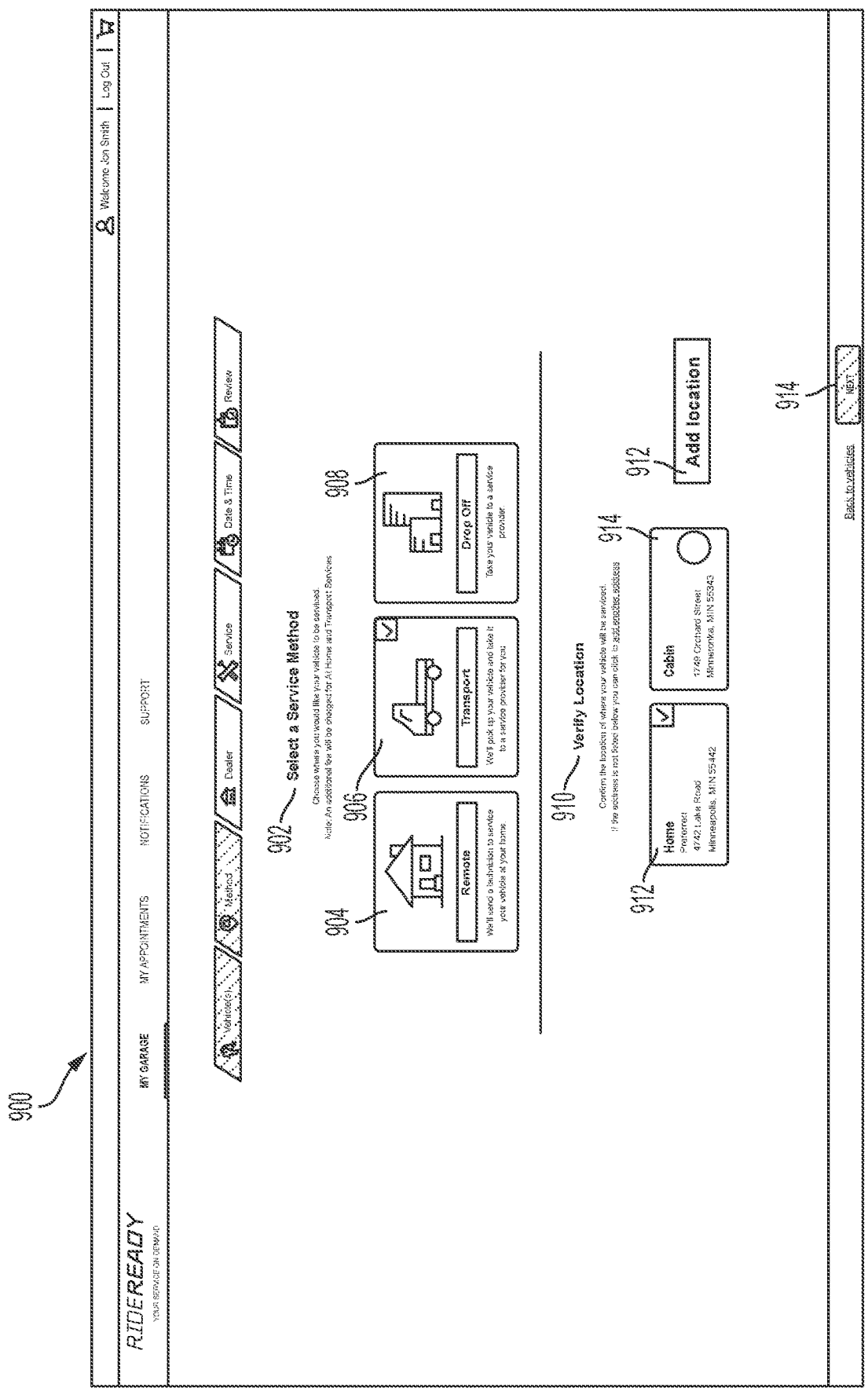
FIG. 9 illustrates an example webpage for selecting a service method to be performed.

FIG. 9 illustrates an example webpage 900 for selecting a type of service method 902 to be performed. The types of service methods 902 provided to the user device 108 via the webpage 900 may include, but are not limited to, remote service 904, transport service 906, and drop-off service 908. Drop-off service 908 entails a user drop off the special-purpose vehicle 110 at a service provider's location. Remote service 904 entails a service provider traveling to a specified location of a special-purpose vehicle 110 and performing the service on the special-purpose vehicle 110 at the specified location. Transport service 906 entails a service provider traveling to a specified location of a special-purpose vehicle 110, transporting the special-purpose vehicle 110 from the specified location to a service location, performing the service at the service location, and then transporting the special-purpose vehicle 110 to a drop-off location. The specified location may the same as the drop-off location or may be different than the drop-off location. In some examples, the specified location and/or drop-off location is a property owned by a user of the special-purpose vehicle 110. For example, the specified location and/or the drop-off location may be the user's cabin, vacation home, primary residence, office, etc. As set forth above, the specified location and the drop-off location may be the same location or a different location.

In some examples, the types of service methods 902 may vary depending on the service provider and the service being performed. As such, in some examples, only one type of service method 902 is provided to the user device 108 via the webpage 900 and in other examples, all the types of service methods 902 are provided.

As stated above, the remote service 904 and the transport service 906 provides benefits over conventional embodiments. Specifically, having service performed on a special-purpose vehicle 110, 802 generally requires trailering the special-purpose vehicle 110, 802 to the service provider's location. In the embodiments disclosed herein, the scheduling server 102 coordinates with service providers that offer remote service 904 and/or transport service 906.

Remote service 904 and transport service 906 provides several benefits over conventional embodiments. First, remote service 904 and transport service 906 do not require the user to own a trailer and a truck capable of towing the trailer and the special-purpose vehicle 110, 802, a benefit compared to conventional service, which usually requires a user to trailer the special-purpose vehicle 110, 802 to a service provider. In addition, remote service 904 and the transport service 906 do not require a user to be present. Instead, the user can schedule the transport service 906 for a special-purpose vehicle 110, 802 that is located at a cabin and/or vacation home while the user is located at his/her primary residence, at work, or otherwise.

In at least some embodiments, remote service 904 and the transport service 906 may not require any interaction on behalf of the user. For example, one or more sensors integrated into the special-purpose vehicle 110, 802 may sense the usage (e.g., mileage, hours, etc.) of the special-purpose vehicle 110, 802. Based on the sensed usage, a signal can be sent to a scheduling server 102 via a user device 108 to schedule regular maintenance on the special-purpose vehicle 110, 802 using the transport service 906. As another example, one or more sensors integrated into the special-purpose vehicle 110, 802 may a component of the special-purpose vehicle 110, 802 is operating at a suboptimal level. Based on the sensed suboptimal operation, a signal can be sent to a scheduling server 102 via a user device 108 or another component of the special-purpose vehicle 110, 802, to schedule maintenance on the special-purpose vehicle 110, 802 using the transport service 906. In some of these embodiments, a user may be sent a prompt to confirm the user wants the maintenance to be performed and in the manner the maintenance is to be performed, e.g., via the transport service 906 as opposed to the remote service.

Remote service 904 and the transport service 906 also allows more efficient allocation of time for the service providers by scheduling services to be performed during traditional "off times." For example, conventional embodiments usually require a user to deliver his/her special-purpose vehicle to a service provider. This is usually performed during traditional non-working hours, such as at night or during the weekends. Due to the transport service 906, a service provider can retrieve a special-purpose vehicle from a designated location during traditional working hours while the user is away at work or not present. This allows service providers to fill their schedules more optimally in comparison to conventional embodiments.

However, in some embodiments, the transport service 906 may offer benefits over the remote service 904. For example, if a service provider needs a certain set of tools to perform a service and the service provider cannot transport the tools to the specified location, the service provider can still provide the service via the transport service 906 method.

Once a service method 902 is selected, a user may be prompted to verify the location 910 of the special-purpose vehicle 110, 802. In some embodiments, the user may manually verify the location 910 and, in some other embodiments, the location 910 may be automatically verified using, e.g., GPS of the special-purpose vehicle 110, 802 and/or GPS of the user device. The location 910 of the special-purpose vehicle 110, 802 can be used by the service provider as the specified location for the "remote" service 904 and/or the transport service 906. Additionally, or alternatively, the location 910 of the special-purpose vehicle 110, 802 can be used by the service provider as the drop-off location for the transport service 906. In some examples, the webpage 900 can suggest locations, such as the home address 912 or the cabin address 914 of a user, based on a location 910 that was previously input by the user. In some examples, the suggested location 912, 914 is based on the special-purpose vehicle 110, 802 that was selected. For example, if a user input into the scheduling server 102 that a specific special-purpose vehicle 110, 802 is stored at the user's home, then the webpage 900 can suggest the user's home address 912 as the location. Similarly, if the specific special-purpose vehicle 110, 802 is stored at the user's cabin, then the webpage 900 can suggest the user's cabin address 914 as the location. Additionally, or alternatively, the webpage 900 provides an icon 912 to add a location.

In some examples, a sensor (e.g., GPS) may automatically sense the location of the special-purpose vehicle 110, 802 and provide that location information to the scheduling server 102. The location 910 of a special-purpose vehicle 110, 802 can be retrieved and/or received by the location component 220 (of FIG. 2) and used by the scheduling server 102 as the specified location. Additionally, or alternatively, the location 910 of a special-purpose vehicle 110, 802 can be retrieved and/or received by the location component 220 (of FIG. 2) and used by the scheduling server 102 as the drop-off location. Once a service method 902 and location 910 are determined, a user can select the "next" icon 914 to navigate to webpage 1000, illustrated in FIG. 10.

Figure 10:
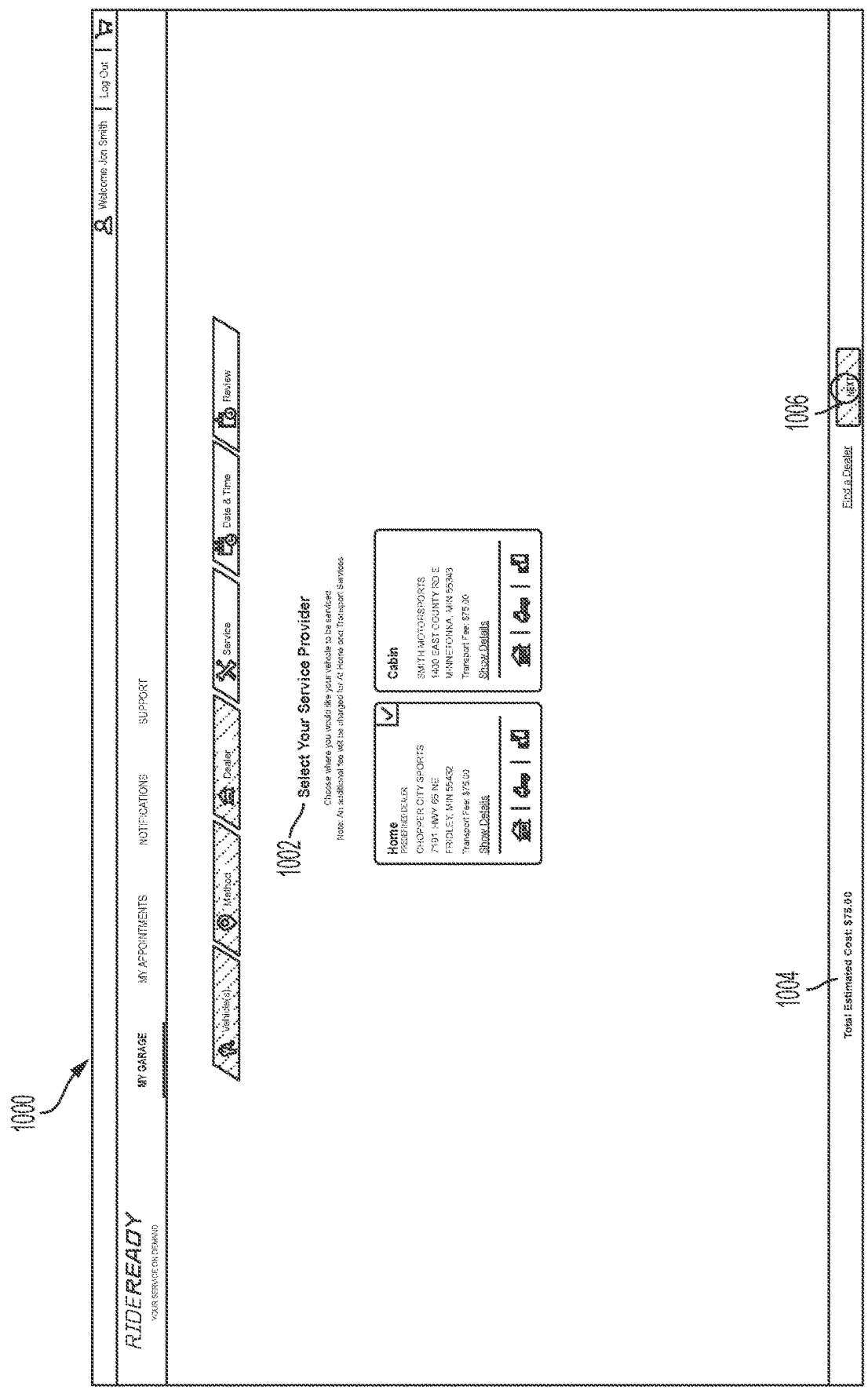
FIG. 10 illustrates an example webpage for selecting a service provider.

FIG. 10 illustrates an example webpage for selecting a service provider 1002. In some examples, the vehicle component 210 matches the special-purpose vehicle 802 selected by the user to a service provider that services the product line of the special-purpose vehicle 802. Additionally, or alternatively, the type of service component 216 will also match the type of service method 902 that was selected with a service provider that performs the selected service method 902. Additionally, or alternatively, the location component 220 of the scheduling server 102 may also provide recommended service providers that are near the location 910 of the special-purpose vehicle 110, 802. Additionally, or alternatively, the scheduling server 102 may recommend service providers based on availability of the service provider using the service hours 402, special hours 404, and lead time 406 that are stored in the time & day component 212. Additionally, or alternatively, the scheduling server 102 may recommend service providers based on the services 502 offered by the service provider that are stored in the service component 214. Additionally, or alternatively, the scheduling server 102 may recommend service providers based on the total cost 624 for one or more services offered by a service provider that are stored in the pricing component 218. Additionally, or alternatively, the scheduling server 102 may recommend service providers based on the brand of the special-purpose vehicle and the brand the service providers services.

In at least another example, the webpage 1000 may include a preselected preferred service provider. The preferred service provider may have been recommended to a user based on one or more of the criteria described above and selected by a user to use as a preferred service provider for future services. In some examples, each of the different locations 910 may have a preselected preferred service provider.

Figure 11:
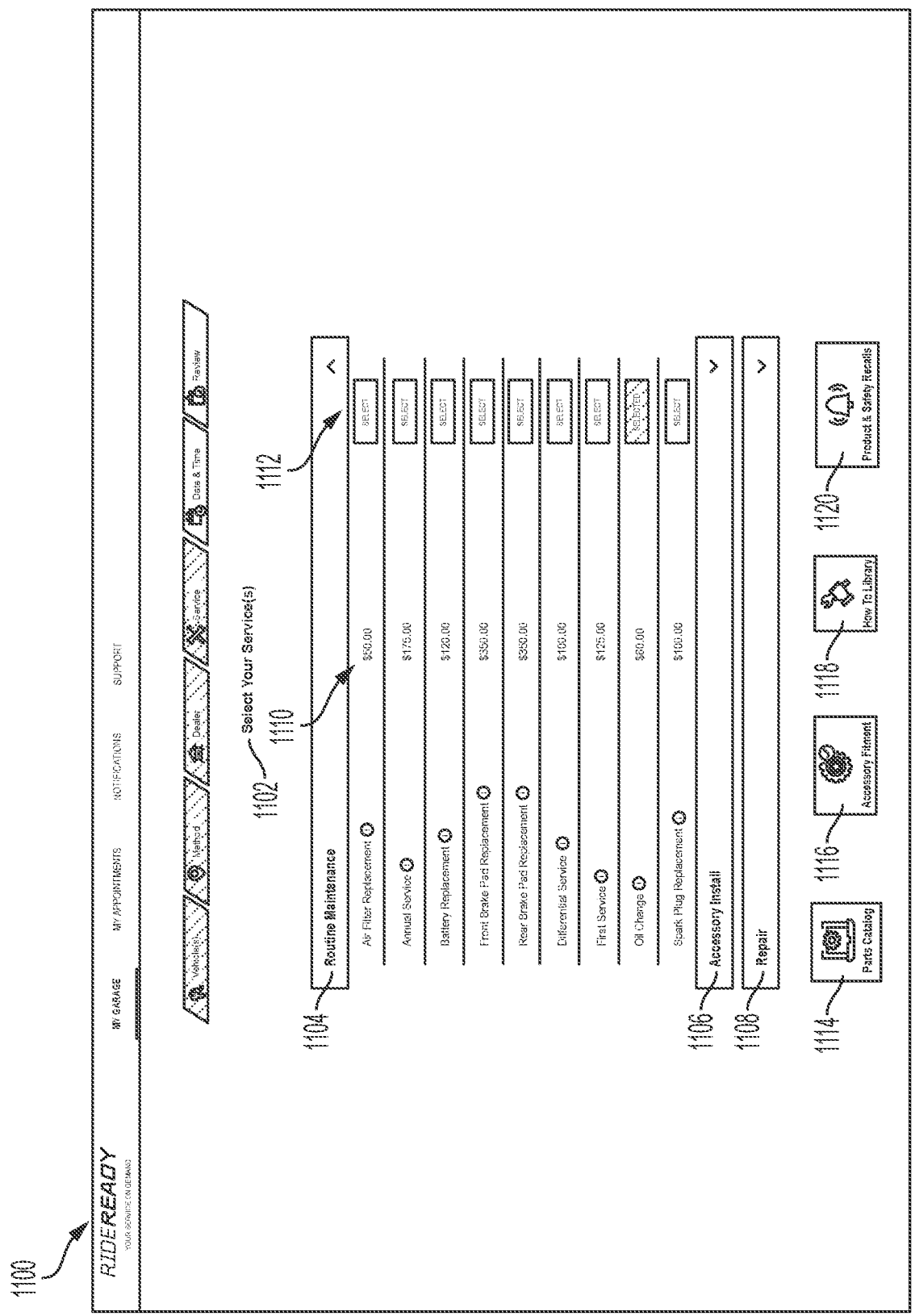
FIG. 11 illustrates an example webpage for selecting a service to be performed.

Once a service provider 1002 is determined, the pricing component 218 can provide an estimated cost 1004 that the service provider 1002 charges for the selected service method 902. Assuming the user is satisfied with the estimated cost 1004, a user can select the "next" icon 1006 to navigate to webpage 1100, illustrated in FIG. 11. FIG. 11 illustrates an example webpage 1100 for selecting a service 1102 to be performed. The services 1102 can include maintenance services 1104, accessory installs 1106, and/or repair 1108. The pricing component 218 may provide a price 1110 for each of the services 1102 to the webpage 1100. The prices 1110 may be specific to the service provider 1002 selected on webpage 1000. A user selects a service 1102 by clicking the "select" icon 1112 next to the service to be performed. After selecting the services to be performed, the user is navigated to webpage 1200.

In some implementations, the webpage 1100 includes a parts catalog icon 1110. Upon selecting the parts catalog icon 1114, the scheduling server 102 can provide what parts are required for various services 1102, whether a selected service provider 1002 has those parts in stock, an anticipated delivery date if a selected service provider 1002 does not have those parts in stock, and/or a price for each part. In some examples, when the selected service provider 1002 does not have one or more of the parts in stock to perform a service 1102, the user can select an alternative service provider 1002 to determine whether the alternative service provider 1002 has the parts in stock so the user can have the special-purpose vehicle 110, 802 serviced at an earlier date.

In some implementations, the webpage 1100 may include an accessory fitment icon 1116. Upon selecting the accessory fitment icon 1116, the scheduling server 102 can provide what accessories fit on and/or are compatible with the selected special-purpose vehicle 110, 802.

In some implementations, the webpage 1100 may include a how-to library icon 1118. Upon selecting the how-to library icon 1118, the scheduling server 102 can provide written or video tutorials for performing one or more of the services 1102. In some embodiments, the user can use this information to better educate himself/herself on the services 1102 that are to be performed on the special-purpose vehicle 110, 802. As such, a user can make a more educated decision on how much a service 1102 should cost to perform.

In some implementations, the webpage 1100 may include a product & safety recall icon 1120. Upon selecting the product & safety recall icon 1116, the scheduling server 102 can provide information on whether the selected special-purpose vehicle 110, 802 and/or any part of the special-purpose vehicle 110, 802 is subject to a recall. Additionally, or alternatively, the scheduling server can 102 provide information on whether specific brands of parts required to perform a service 1102 are subject to a recall so the user can coordinate with the service provider 1002 to avoid those parts.

In some embodiments, notifications about product recalls are automatically provided by the scheduling server 102 to the user based on the special-purpose vehicle(s) 110, 802 the user owns. For example, if a recall for a specific special-purpose vehicle 110, 802 is input into the scheduling server 102, the scheduling server 102 may search the database 104 for users owning the specific special-purpose vehicle 110, 802 and output to the user a notification about the recall. In some embodiments, instead of being input into the scheduling server 102, the scheduling server 102 may crawl web sites for news articles about recalls on special-purpose vehicle 110, 802 and populate the database 104 with the recalls based on the news articles.

Figure 12:
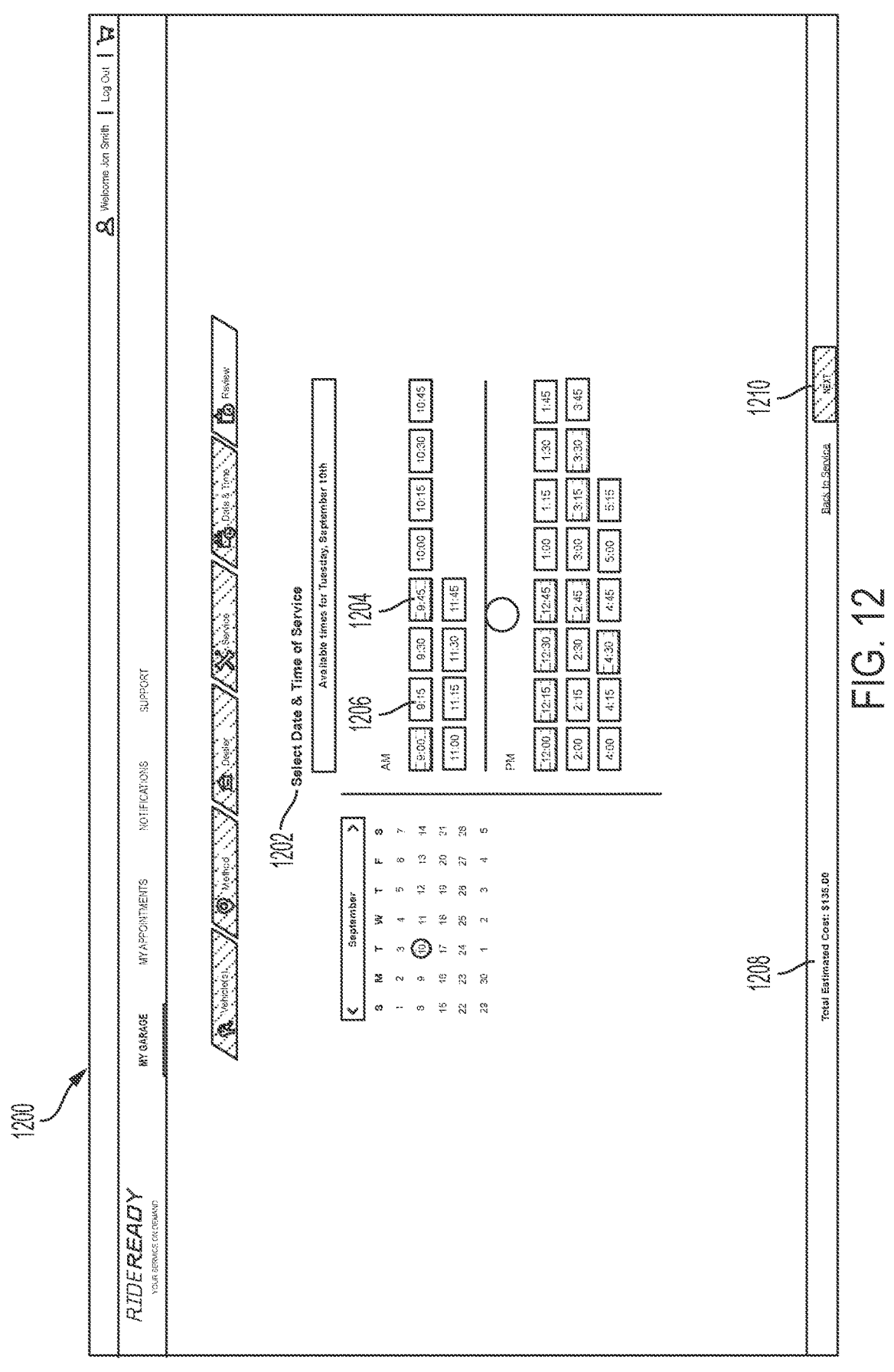

FIG. 12 illustrates an example webpage 1200 for selecting a day and time 1202 for the service to be performed. The days and times 1202 available for a service are specific to the service provider. For example, the time & day component 212 retrieves the service providers service hours 402, special hours 404, the duration 616, the service method 902, and any appointments that have previously been made for the service provider. The time & day component 212 then provides the webpage 1200 with any days and times 1202 within the service hours 402 that an appointment has not previously been scheduled and include an amount of time necessary to complete the selected service including the time for the selected service method 902. The unavailable times may be greyed out (e.g., the time 1204) and the available times (e.g., the time 1206) are able to be selected, as illustrated. In some examples, the webpage 1200 includes a total estimated cost 1208, which includes the price 1110 for the selected service and the estimated cost 1004 for the selected service method 902. After selecting a day and time 1202 for the service to be performed, a user can select the "next" icon 1210 to navigate to webpage 1300, illustrated in FIG. 13.

Figure 13:
FIG. 13 illustrates an example webpage for reviewing a potential service to be performed.

FIG. 13 illustrates an example webpage 1300 for reviewing a potential service 1302 to be performed. The potential service 1302 to be performed includes the day & time 1304 the service is to be performed, the service type 1306, the service provider 1308, the vehicle 1310 to be serviced, the service 1312 to be performed, the cost 1314 of the service to be performed, any additional fees 1316, which include any fees for the type of service method 902, and the total estimated cost 1318. In some examples, the webpage 1300 can also include a comment box 1320 for a user to provide comments. The comment box 1320 may be useful if the user is scheduling the transport service method and the user will not be present when the service provider retrieves the special-purpose vehicle 110, 802 at the designated location. In these embodiments, the user may provide comments on how the service provider can access the special-purpose vehicle (e.g., the special-purpose vehicle 110, 802 is located inside a garage and the garage access code is #345).

If the user is satisfied with the total estimated cost 1318 and the other details of the service, the user can select the "next" icon 1320 to navigate to webpage 1400, illustrated in FIG. 14.

FIG. 14 illustrates an example webpage 1400 including a notification 1402 to a user of a scheduled service to be performed. As illustrated, the notification 1402 includes the ability to add the scheduled service to the user's calendar by clicking on the "add to calendar" icon 1402. The notification 1402 also includes the type of service method 1404, the vehicle to be serviced 1406, the service 1408 to be performed, and the service provider 1410.

Figure 15:
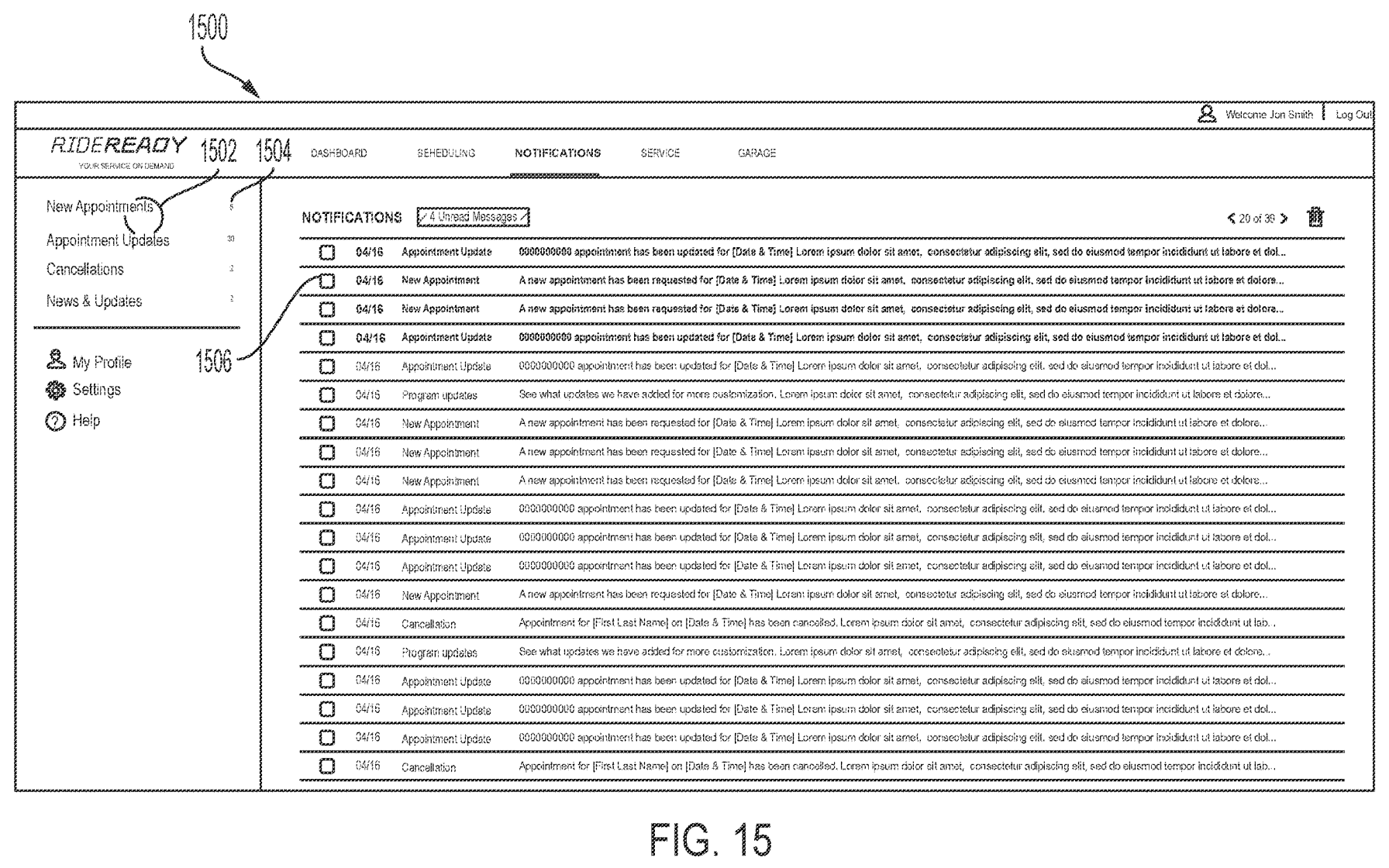

FIG. 15 illustrates an example webpage 1500 for notifications to a service provider of scheduled services to be performed. As illustrated, the webpage 1500 includes a notification for new appointments 1502. In some examples, the scheduling server 102 sends a notification to a service provider device 106 for a new appointment after a user device 108 confirms a service. As illustrated, the new appointment notification 1502 may include the number of new appointments 1504 that have been sent to the service provider device 106 since the last time the service provider reviewed the new appointments 1502. To view the details of a new appointment, a service provider can click on the new appointment that the service provider would like to view, e.g., the new appointment 1506. In response, the service provider is directed to webpage 1600.

Figure 16:
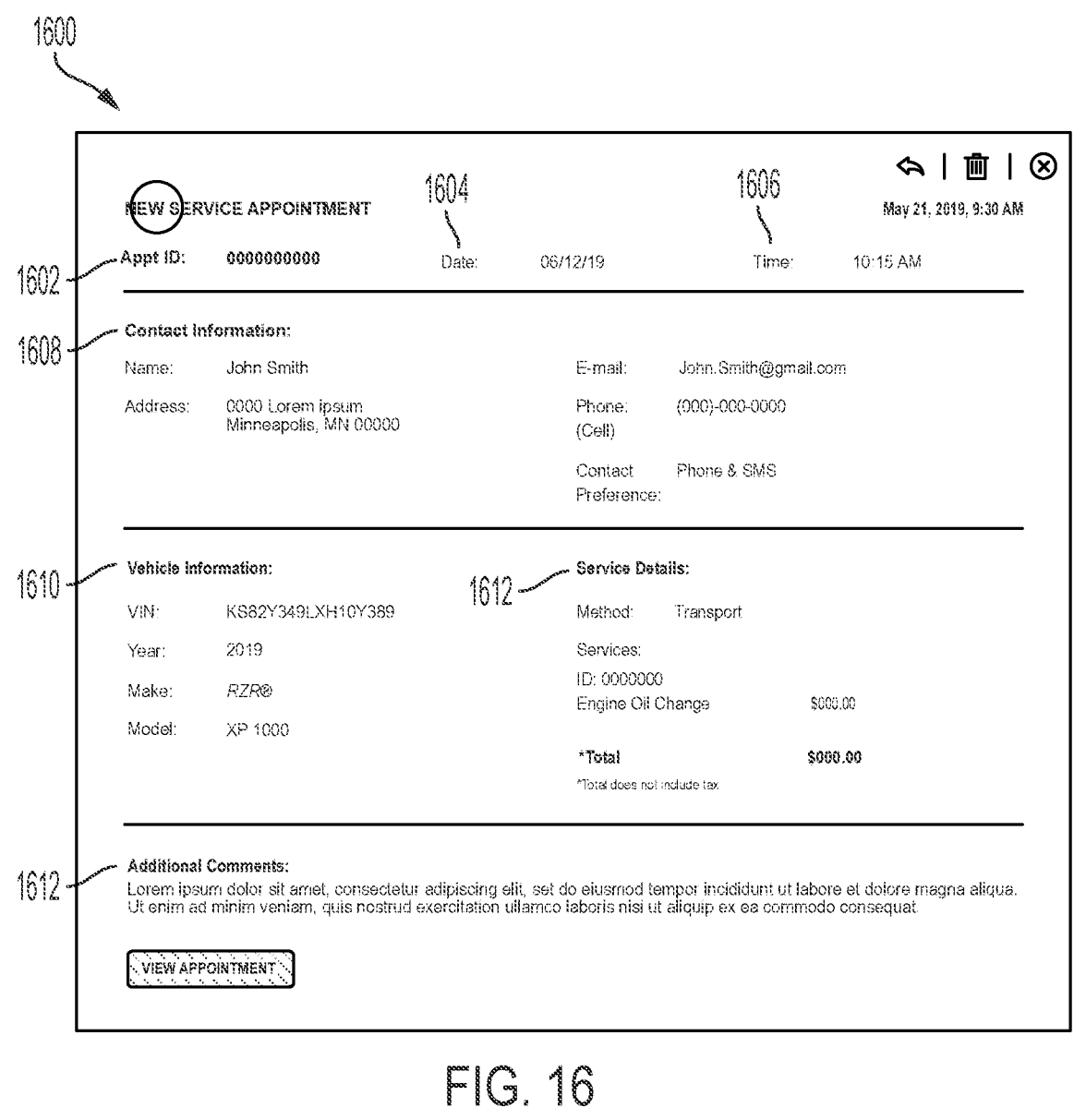

FIG. 16 illustrates an example webpage 1600 for notification details to a service provider of a scheduled service to be performed. The webpage 1600 may include an appointment id 1602, which the service provider can use to track the scheduled service. The webpage 1600 may also include the date 1604 and time 1606 to perform the service and contact information 1608 that the service provider can use to contact the owner or other responsible party of the special-purpose vehicle 110, 802. In some examples, the webpage 1600 also includes the vehicle information 1610, such as the VIN, year, make, and model of the special-purpose vehicle 110, 802, so that the service provider can be ready to service the special-purpose vehicle 110, 802 by having the appropriate staff on hand and any parts ordered to complete the service on the date 1604 and time 1606 of the scheduled service. The webpage 1600 may also include the service details 1612 for the service, such as the type of service method (e.g., transport), the service to be performed, and the total cost of the service. Additionally, or alternatively, the webpage 1600 may include any additional comments 1612 that are provided along with the scheduled service. For example, the additional comments 1612 may include how to access the special-purpose vehicle 110, 802 if the service provider is retrieving the vehicle at a designated location (i.e., providing the transport service method) and the user will not be present. Additionally, or alternatively, a user may input into the additional comments 1612 the specified location and/or drop-off location.

Figure 17:
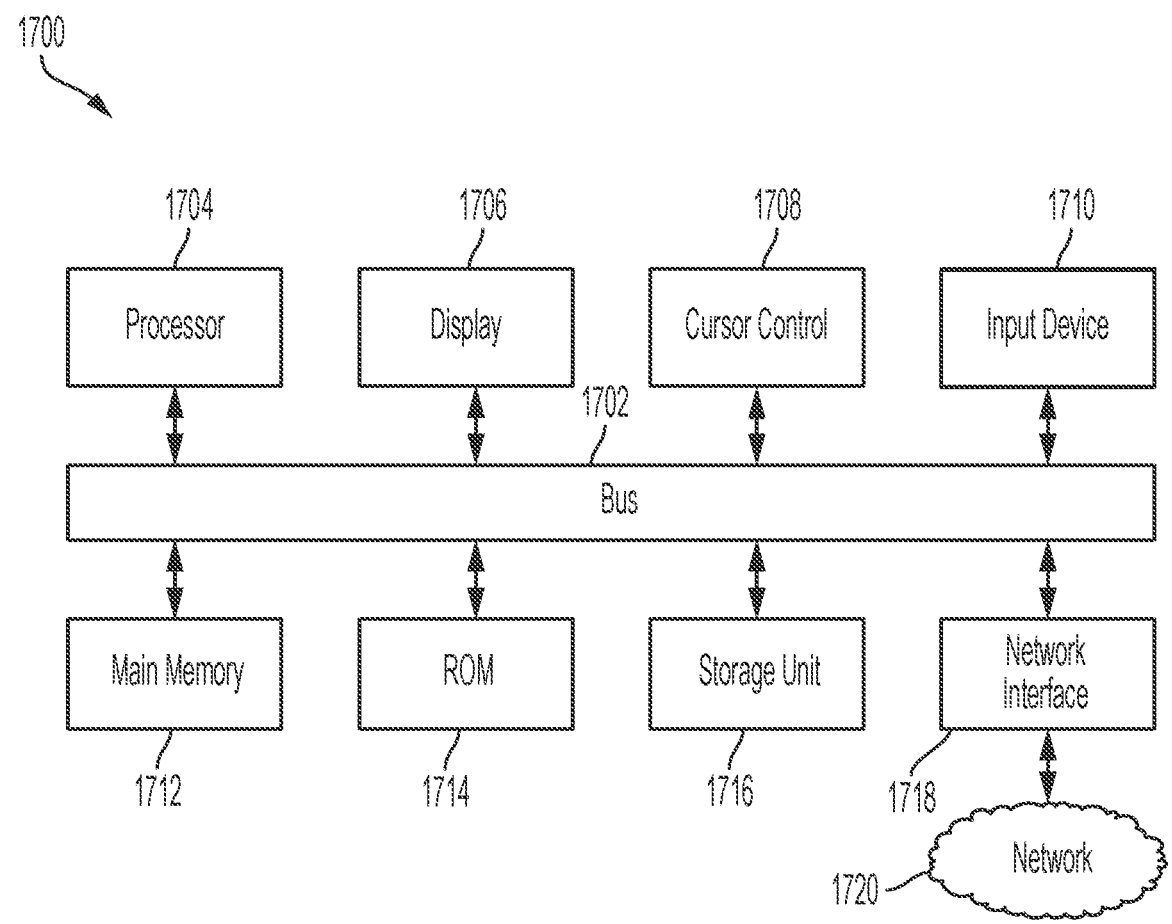
FIG. 17 illustrates a diagram of a computing system for implementing a system for scheduling special-purpose vehicle services.

FIG. 17 illustrates a diagram of a computing system 1700 for implementing a system for scheduling special-purpose vehicle services. For example, some or all of the functions of the scheduling server 102 (e.g., the components 204, 208-220), the database 104, the service provider devices 106, and/or the user devices 108 may be performed by a computing system that has similar components as the computing system 1700. This diagram is merely an example, which should not unduly limit the scope of the claims. One of ordinary skill in the art would recognize many variations, alternatives, and modifications.

The computing system 1700 includes a bus 1702 or other communication mechanism for communicating information between, a processor 1704, a display 1706, a cursor control component 1708, an input device 1710, a main memory 1712, a read only memory (ROM) 1714, a storage unit 1716, and/or a network interface 1718. In some examples, the bus 1702 is coupled to the processor 1704, the display 1706, the cursor control component 1708, the input device 1710, the main memory 1712, the read only memory (ROM) 1714, the storage unit 1716, and/or the network interface 1718. And, in certain examples, the network interface 1718 is coupled to a network 1720 (e.g., the network 112).

In some examples, the processor 1704 includes one or more general purpose microprocessors. In some examples, the main memory 1712 (e.g., random access memory (RAM), cache and/or other dynamic storage devices) is configured to store information and instructions to be executed by the processor 1704. In certain examples, the main memory 1712 is configured to store temporary variables or other intermediate information during execution of instructions to be executed by processor 1704. For example, the instructions, when stored in the storage unit 1716 accessible to processor 1704, render the computing system 1700 into a special-purpose machine that is customized to perform the operations specified in the instructions (e.g., the components 204, 208-220). In some examples, the ROM 1714 is configured to store static information and instructions for the processor 1704. In certain examples, the storage unit 1716 (e.g., a magnetic disk, optical disk, or flash drive) is configured to store information and instructions.

In some embodiments, the display 1706 (e.g., a cathode ray tube (CRT), an LCD display, or a touch screen) is configured to display information to a user of the computing system 1700. In some examples, the input device 1710 (e.g., alphanumeric and other keys) is configured to communicate information and commands to the processor 1704. For example, the cursor control 1708 (e.g., a mouse, a trackball, or cursor direction keys) is configured to communicate additional information and commands (e.g., to control cursor movements on the display 1706) to the processor 1704.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A user device for scheduling a service for a special-purpose vehicle, the user device comprising:
   a user interface;
   a processor; and
   memory comprising instructions that when executed by the processor cause the processor to:
   receive, via the user interface, user input comprising an indication of a service to be performed on the special-purpose vehicle;
   determine, based on the indication of the service to be performed on the special-purpose vehicle, a set of available service method types from a set of service method types, wherein:
   the set of service method types includes a first service method type, a second service method type, and a third service method type; and
   the set of available service method types includes the first service method type and the second service method type;
   output, to the user interface, a plurality of service method icons for the determined set of available service method types, comprising:
   a first service method icon corresponding to the first service method type for the service to be performed on the special-purpose vehicle at a first location; and
   a second service method icon corresponding to the second service method type for the service to be performed on the special-purpose vehicle at a second location, wherein the first location and the second location are different locations and the second service method type is different than the first service method type;
   receive, via the user interface, user input comprising a selection of a service method icon from the plurality of service method icons;
   send, to a scheduling server, a signal corresponding to the selected service method icon to schedule the service for the special-purpose vehicle in a scheduling database according to the selected service method icon; and
   receive, from the scheduling server, a notification that the service for the special-purpose vehicle to be performed by the service provider is scheduled.

2. The user device of claim 1, the first location being a property owned by a user of the special-purpose vehicle.

3. The user device of claim 1, the second location being a service center.

4. The user device of claim 1, the plurality of service method icons comprising a third service method icon corresponding a transport service method of the set of available service method types, such that, for the transport service method, a service provider retrieves the special-purpose vehicle at the first location, performs the service at the second location, and returns the special-purpose vehicle to a drop-off location.

5. The user device of claim 4, wherein the first location and the drop-off location are the same locations.

6. The user device of claim 1, the memory further comprising instructions that when executed by the processor cause the processor to:
   output, to the user interface, at least one special-purpose vehicle icon, wherein each special-purpose vehicle icon corresponds to a special-purpose vehicle that was previously input by a user into the server;
   receive, via the user interface, a selection of a special-purpose vehicle icon of the at least one special-purpose vehicle icon for which the service is to be performed; and
   send, to the scheduling server, a signal corresponding to the special-purpose vehicle associated with the selected special-purpose vehicle icon.

7. The user device of claim 1, the memory further comprising instructions that when executed by the processor cause the processor to output, to the user interface, a price for the service, wherein the price is set by the service provider.

8. The user device of claim 7, the price being based on at least one of:
   a type of the special-purpose vehicle;
   a brand of the special-purpose vehicle;
   the selected service method icon;
   the first location; or
   the second location.

9. The user device of claim 1, the memory further comprising instructions that when executed by the processor cause the processor to output, to the user interface, a plurality of services, each service of the plurality of services having a corresponding price determined by the service provider.

10. The user device of claim 1, the memory further comprising instructions that when executed by the processor cause the processor to output, to the user interface, a plurality of service providers, the plurality of service providers being based on the first location, the second location, or both.

11. The user device of claim 1, the memory further comprising instructions that when executed by the processor cause the processor to output, to the user interface, a plurality of service providers, the plurality of service providers being based on a type of the special-purpose vehicle, a brand of special-purpose vehicle, or both.

12. The user device of claim 1, the service provider being a preferred service provider that has been previously selected by a user.

13. The user device of claim 1, the memory further comprising instructions that when executed by the processor cause the processor to:
   output, to the user interface, a plurality of days and times the service provider has availability to perform the service;
   receive, via the user interface from a user, a selection of a day and a time of the plurality of days and times, wherein the scheduled service occurs on the selected day and time; and
   send, to the scheduling server, a signal corresponding to the selected day and time.

14. The user device of claim 1, wherein the first service method type and the second service method type are each determined based on a location indicated by a global positioning system (GPS) of the special-purpose vehicle.

15. The user device of claim 1, wherein the first service method type is associated with movement of the special-purpose vehicle to the first location.

16. The user device of claim 1, wherein the first service method type is one of:
   a transport service;
   a remote service;
   or a drop-off service.

17. The method of claim 1, wherein the first service method type and the second service method type are each determined based on the service being performed on the special-purpose vehicle.

18. The user device of claim 1, wherein the set of available service method types has fewer service method types than the set of service method types.

19. A user device for scheduling a service for a special-purpose vehicle, the user device comprising:
   a user interface;
   a processor; and
   memory comprising instructions that, when executed by the processor, cause the processor to:
      receive, via the user interface, user input comprising an indication of a service to be performed on the special-purpose vehicle;
      determine, based on the indication of the service to be performed on the special-purpose vehicle, a set of available service method types from a set of service method types, wherein:
         the set of service method types includes a first service method type, a second service method type, and a third service method type; and
         the set of available service method types includes the firsts service method type and the second service method type;
      output, to the user interface, a plurality of service method icons for the determined set of available service method types, comprising:
         a first service method icon corresponding to a first service method type for the service to be performed on the special-purpose vehicle at a first location, wherein the first service method type is a transport service; and
         a second service method icon corresponding to a second service method type for the service to be performed on the special-purpose vehicle at a second location, wherein the first location and the second location are different locations, and the second service method type is a drop-off service;
      receive, via the user interface, user input comprising a selection of a service method icon from the plurality of service method icons;
      send, to a scheduling server, a signal corresponding to the selected service method icon to schedule the service for the special-purpose vehicle in a scheduling database according to the selected service method icon; and receive, from the scheduling server, a notification that the service for the special-purpose vehicle to be performed by the service provider is scheduled.

20. The user device of claim 19, the first location being a property owned by a user of the special-purpose vehicle.

21. The user device of claim 19, the second location being a service center.

22. The user device of claim 19, the memory further comprising instructions that, when executed by the processor, cause the processor to:
output, to the user interface, at least one special-purpose vehicle icon, wherein each special-purpose vehicle icon corresponds to a special-purpose vehicle that was previously input by a user into the server;
receive, via the user interface, a selection of a special-purpose vehicle icon of the at least one special-purpose vehicle icon for which the service is to be performed; and
send, to the scheduling server, a signal corresponding to the special-purpose vehicle associated with the selected special-purpose vehicle icon.

23. The user device of claim 19, wherein the first service method type and the second service method type are each determined based on a location indicated by a global positioning system (GPS) of the special-purpose vehicle.

24. The user device of claim 19, wherein the first service method type and the second service method type are each determined based on the service being performed on the special-purpose vehicle.

25. The users device of claim 19, wherein the set of available service method types has fewer service method types than the set of service method types.

26. A system, comprising:
a processor; and
memory comprising instructions that, when executed by the processor, cause the processor to:
determine, based on a service to be performed on the special-purpose vehicle, a set of available service method types from a set of service method types, wherein the set of available service method types has fewer service method types than the set of service method types and comprises a first service method type and a second service method type, and wherein the first service method type is different than the second service method type;
output, to a user interface, a plurality of service method icons for the determined set of available service method types, the plurality of service method icons comprising:
a first service method icon corresponding to the first service method type for the service to be performed on the special-purpose vehicle at a first location; and
a second service method icon corresponding to the second service method type for the service to be performed on the special-purpose vehicle at a second location, wherein the first location and the second location are different locations;
receive, via the user interface, user input comprising a selection of a service method icon from the plurality of service method icons;
send, to a scheduling server, a signal corresponding to the selected service method icon to schedule the service for the special-purpose vehicle in a scheduling database according to the selected service method icon; and
receive, from the scheduling server, a notification that the service for the special-purpose vehicle to be performed by the service provider is scheduled.

27. The system of claim 26, wherein the first service method type is associated with movement of the special-purpose vehicle to the first location.

28. The system of claim 26, wherein the first service method type is a transport service.

29. The system of claim 26, wherein the first service method type is a remote service.

30. The system of claim 26, wherein the first service method type is a drop-off service.

31. The system claim 26, the memory further comprising instructions that, when executed by the processor, cause the processor to:
output, to the user interface, at least one special-purpose vehicle icon, wherein each special-purpose vehicle icon corresponds to a special-purpose vehicle that was previously input by a user into the server;
receive, via the user interface, a selection of a special-purpose vehicle icon of the at least one special-purpose vehicle icon for which the service is to be performed; and
send, to the scheduling server, a signal corresponding to the special-purpose vehicle associated with the selected special-purpose vehicle icon.

32. The system of claim 26, wherein, based on the service being performed on the special-purpose vehicle, a third service method icon corresponding to a third service method type is omitted from the user interface.

* * * * *